(12) United States Patent
Uemura et al.

(10) Patent No.: US 6,296,562 B1
(45) Date of Patent: Oct. 2, 2001

(54) AIR PASSAGE SWITCHING DEVICE AND AIR CONDITIONING APPARATUS HAVING THE SAME

(75) Inventors: Yukio Uemura, Nagoya; Noboru Ohfuji, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/377,880

(22) Filed: Aug. 19, 1999

(30) Foreign Application Priority Data

| Sep. 8, 1998 | (JP) | 10-254021 |
|---|---|---|
| Nov. 2, 1998 | (JP) | 10-312327 |
| Dec. 8, 1998 | (JP) | 10-348780 |
| Dec. 9, 1998 | (JP) | 10-350310 |
| Mar. 12, 1999 | (JP) | 11-066946 |

(51) Int. Cl.$^7$ .................................................. B60S 1/54
(52) U.S. Cl. ......................... 454/121; 454/156; 454/159; 454/160; 251/901
(58) Field of Search ................................. 454/121, 156, 454/159, 160; 165/42, 43; 251/901

(56) References Cited

U.S. PATENT DOCUMENTS 5,160,115   11/1992   Ito et al. .

FOREIGN PATENT DOCUMENTS

| 35 14358 C2 | 10/1986 | (DE) . |
|---|---|---|
| A-4-87826 | 3/1992 | (JP) . |
| A-8-2238 | 1/1996 | (JP) . |

*Primary Examiner*—Jiping Lu
(74) *Attorney, Agent, or Firm*—Harness, Dickey & Pierce, PLC

(57) ABSTRACT

In an air passage switching device, suitable for use for example in a vehicle air conditioning apparatus, for switching a flow of air among a plurality of air passages by moving a film door in one direction by a stepping motor and in another direction by the spring force of coil spring, when the film door is moved in the direction in which it winds up the coil spring the pulse rate of the stepping motor is reduced to thereby increase the motor torque and prevent the occurrence of a shortage of motor torque. When the film door is moved in the other direction the pulse rate of the stepping motor is increased to reduce the motor torque.

11 Claims, 21 Drawing Sheets

| METHOD | BLOW OUT MODE | TARGET NUMBER OF STEPS |
|---|---|---|
| MANUAL | FACE | 300 |
| | B/L | 800 |
| | FOOT | 1400 |
| | F/D | 1600 |
| | DEF | 2000 |
| AUTOMATIC | FACE | 300 |
| | B/L | 800 |
| | FOOT | 1400 |

AIR PASSAGE SWITCHING DEVICE AND AIR CONDITIONING APPARATUS HAVING THE SAME

CROSS REFERENCE TO RELATED APPLICATIONS

This application is based upon and claims priority from Japanese Patent Application Nos. Hei 10-254021 filed Sep. 8, 1998, and Hei 10-312327 filed Nov. 2, 1998, and Hei 10-348780 filed Dec. 8, 1998, and Hei 10-350310 filed Dec. 9, 1998, and Hei 11-66946 filed Mar. 12, 1999, the contents of which are incorporated herein by reference.

BACKGROUND OF THE INVENTION

1. Field of the Invention

This invention relates to an air passage switching device for switching air passages by moving in the air passages a film member (film door) in which are formed openings for air to pass through, and an air conditioning apparatus in which this air passage switching device is used.

2. Related Art

Air passage switching devices for switching air passages by moving a film door of this kind in related art include for example that disclosed in Japanese Patent Application Laid-Open No. H8-2238. In this related art, the ends of a flexible film door such as a resin film are joined to a driving shaft (first rotating shaft) and a driven shaft (second rotating shaft) rotatably mounted in an air-conditioner case; the ends of the two shafts are coaxially connected to pulleys, and the ends of a wire are wound around these pulleys. A motor is connected to the driving shaft and rotates the driving shaft.

When the driving shaft rotates in the direction in which it takes up the film door, the driving shaft directly takes up the film door and the film door moves. Conversely, when the driving shaft rotates in the direction in which it lets out the film door, this rotation of the driving shaft is transmitted to the driven shaft via the pulleys and the wire, and the driven shaft rotates in the direction in which it takes up the film door and the film door is thus moved and taken up by the driven shaft.

By the film door being moved in forward and reverse directions inside the air conditioner case in this way, air passages such as ventilation air passages leading to a vehicle passenger compartment can be switched freely.

However, in this related art, interference between moving members, such as the pulleys and the wire, and parts such as a ventilation duct around the air conditioner case has been a problem, and the freedom of design of these parts has diminished, resulting in increased manufacturing cost.

Furthermore, because a mechanism connecting two pulleys with a wire is provided as described above to make the driving shaft and the driven shaft cooperate, there has been the problem that the number of parts in the apparatus as a whole is increased, its assembly is complicated, and its cost is increased.

In German Patent No. 3,514,358, an air passage switching device using a film door in which it is possible to dispense with the above-mentioned connecting mechanism (pulleys and wire) is disclosed.

FIG. 29 shows schematically the basic construction of this related art dispensing with the connecting mechanism. As shown in FIG. 29, it has a driving motor 100, a driving shaft 101, a film door 102 and a driven shaft 103, and a driving coil spring 104 is connected to the driven shaft 103.

According to this related art, when the driving shaft 101 is rotated by the driving motor 100 in the direction ① in which it takes up the film door 102, the driven shaft 103 is rotated by the film door 102 and winds up the coil spring 104. And when the driving shaft 101 is rotated by the driving motor 100 in the opposite direction ② in which it lets out the film door 102, because the coil spring 104 unwinds under its own spring force, the driven shaft 103 is rotated back in that direction by the spring force of the coil spring 104 and the film door 102 is taken up by the driven shaft 103.

According to this related art, because when the driving shaft 101 is driven by the driving motor 100 to rotate in the direction ① in which it takes up the film door 102 the coil spring 104 is wound up, the spring force due to winding of the coil spring 104 increases in proportion to the distance moved (stroke) of the film door 102. In other words, the operating force on the film door 102 increases in proportion to the distance moved by the film door 102.

This will now be explained with reference to FIG. 5, in which ① and ② respectively correspond to the direction ① in which the film door 102 is taken up by the driving shaft 101 and the direction ② in which it is returned to the driven shaft 103 in FIG. 29. When the film door 102 is taken up by the driving shaft 101 (movement direction ①,) the wound up amount of the coil spring 104 increases as the movement distance of the film door 102 increases. Accordingly, the torque $T_1$ necessary for the winding up of the coil spring 104 increases.

Here, the torque $T_0$ required to move the film door 102 is always fixed, irrespective of the distance moved by the film door 102, and therefore, when the film door 102 is taken up by the driving shaft 101, the film door take-up torque required of the driving motor 100 increases as the distance moved by the film door 102 increases, as shown with the solid line ① in FIG. 5.

When on the other hand the film door 102 is returned from the driving shaft 101 to the driven shaft 103 (movement direction ②), the coil spring 104 unwinds under its own spring force and the driven shaft 103 is rotated in the opposite direction by the spring force of the coil spring 104 and the driven shaft 103 takes up the film door 102, and therefore the film door take-up torque required of the driving motor 100 becomes zero, as shown with the solid line ② in FIG. 5.

However, in this related art, there is no mention of countermeasure for the operating force on the film door 102, which increases with the stroke of the film door 102. Consequently, there may be a risk of a torque shortage of the driving motor 100 during the process of moving the film door 102 in the direction ① in which the coil spring 104 is wound up and of consequent defective operation of the film door 102.

SUMMARY OF THE INVENTION

It is therefore an object of the present invention to, in an air passage switching device which switches air passages by moving a film door and moves the film door in one direction by means of a driving motor and moves the film door in another direction by means of an elastic force, prevent a shortage of driving motor torque arising when the film door is moved in the direction in which the elastic force increases as the distance moved by the film door increases.

It is another object of the present invention to, in an air conditioning apparatus for use in a vehicle, make it possible for switching to a defroster mode to be carried out rapidly.

The present invention is applicable to a device which uses as the motor for driving the film door a stepping motor whose motor rotation (rotation angle) is regulated by pulse number of steps (input pulse count); with this stepping motor, the torque changes as shown in FIG. 6 with variation in the pulse rate PPS, which is the number of pulses per unit time (normally one second). That is, the motor torque decreases as the pulse rate PPS increases.

Accordingly, the present invention focuses on the pulse rate PPS in the stepping motor, and achieves the above-mentioned objects by associating this pulse rate PPS with the direction of movement of the film door in control.

According to an aspect of the present invention, a first pulse rate which is applied to a stepping motor when one end of a film door is taken up by a first rotating shaft and a second pulse rate which is applied to the stepping motor when the other end of the film door is taken up by a second shaft are set in such a manner that the first pulse rate is less than the second pulse rate.

Accordingly, when one end of the film door is taken up by the first rotating shaft as it is rotated by the stepping motor, an elastic member elastically deforms so that its elastic force increases; however, at this time, by the pulse rate of the stepping motor being made small, the torque of the stepping motor can automatically be made to increase. Therefore, because the motor torque necessary for moving the film door is provided without fail, defective operation of the film door caused by a shortage of torque is prevented.

On the other hand, when the film door moves under the elastic force of the elastic member, the torque required from the stepping motor is small. Accordingly, at this time, by making the pulse rate of the stepping motor large, it is possible to reduce the torque of the stepping motor and raise the motor rotation speed. That is, by using the spring force of the elastic member to move the film door and raising the rotation speed of the stepping motor, it is possible to complete a movement of the film door (an air passage switch) rapidly in a short time.

According to another aspect of the present invention, the second shaft is hollow and has an axial cavity, and the elastic member consists of a coil spring disposed inside the cavity of the second shaft.

In this case, because the coil spring can be built in to the cavity of the second shaft, the coil spring can be installed compactly.

According to another aspect of the present invention, an air passage switching device for switching a plurality of air passages between at least two opening modes has a film, a first rotation shaft, a second rotation shaft having an elastic member, and a driver connected to the first rotation shaft for rotating the first rotation shaft.

The elastic member is deformed as the second rotation shaft rotates when the first rotation shaft is rotated in a first rotational direction by the driver such that a first end of the film is wound up by the first rotation shaft.

The second rotation shaft is rotated by an elastic force of the elastic member such that a second end of the film is wound up by the second rotation shaft when the first rotation shaft is rotated in a second rotational direction opposite to the first rotational direction by the driver and when the first end of the film is unwound from the first rotation shaft.

Switching to one of the opening modes which requires a shorter switching time is performed by moving the film with the elastic force of the elastic member.

Accordingly, switching time for switching to one of the opening modes which requires a shorter switching time is shortened by the elastic force.

DETAILED DESCRIPTION OF THE PREFERRED EMBODIMENTS

Figure 1:
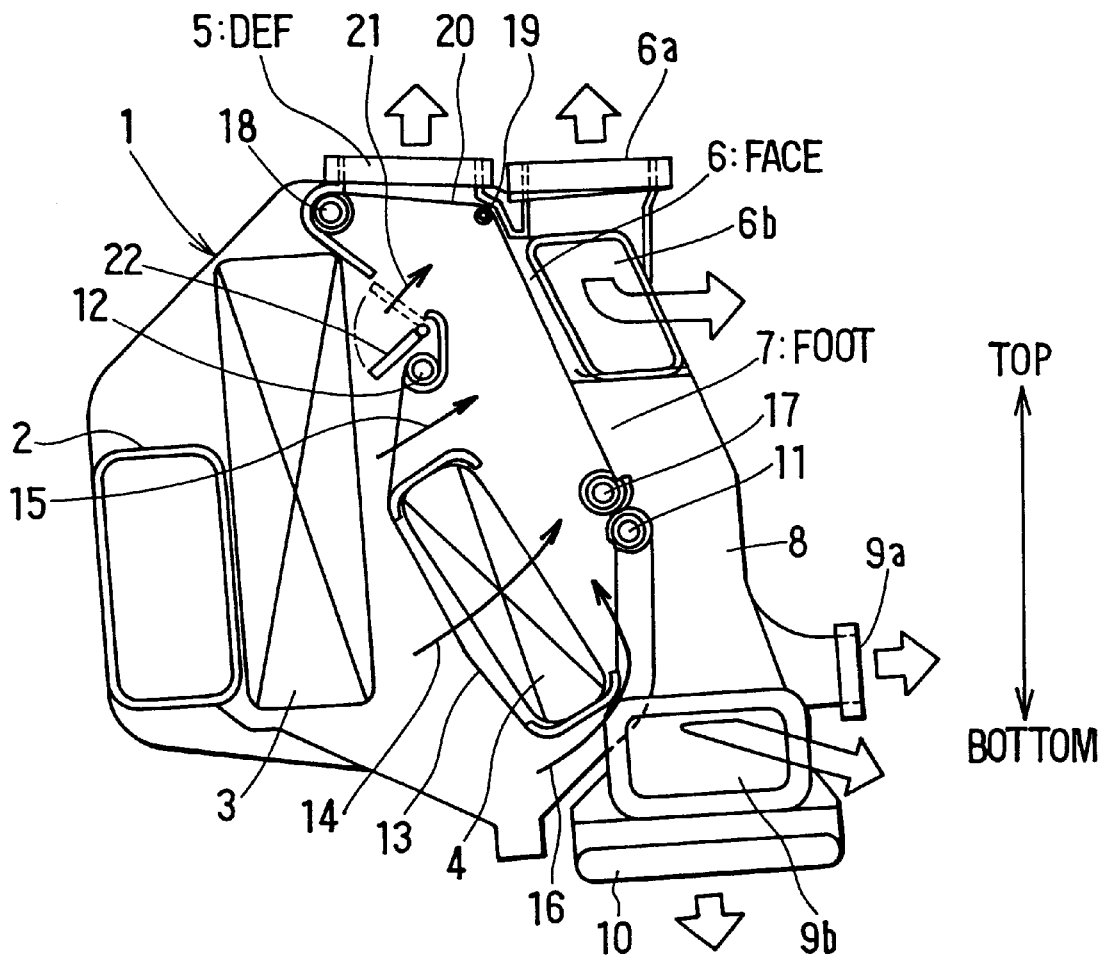
FIG. 1 is a sectional view of an air conditioning unit of a vehicle air conditioning apparatus in which the present invention has been applied.

Preferred embodiments of the present invention will now be described with reference to the accompanying drawings.
(First Preferred Embodiment)

FIG. 1 through FIG. 11 show a first preferred embodiment, wherein the invention is applied to an air conditioning apparatus for use in a vehicle. The vehicle air conditioning apparatus in this preferred embodiment has a resin air-conditioner case (case member) 1, and this air-conditioner case 1 is mounted approximately centrally in the left-right direction behind a dash board in the passenger compartment of a car and with the orientation shown in FIG. 1 with respect to the front-rear direction of the vehicle and the vertical direction.

The air-conditioner case 1 has an air inlet 2 opening in a side face of the end thereof nearer the front of the vehicle. In the case of a right hand drive vehicle, this air inlet 2 is disposed in the face of the air-conditioner case 1 on the passenger seat side (the face on the vehicle left side) thereof, and the air outlet of a blower unit (not shown) mounted in the passenger seat side of the dash board is connected to the air inlet 2. When a blower inside the blower unit is operated, air flows through the air inlet 2 into the air-conditioner case 1.

Inside the air-conditioner case 1, an evaporator 3 and a heater core 4 are disposed in that order from the air upstream side. The evaporator 3 forms a part of an ordinary refrigerating cycle and is a cooling heat exchanger for cooling air blown into the air-conditioner case 1. The heater core 4 is a heating heat exchanger for heating air inside the air-conditioner case 1 with warm water (engine cooling water) flowing through it as a heat source.

A plurality of outlet ports 5 through 7 are formed in the downstream end of the air-conditioner case 1, and outlet ducts (not shown) for delivering air conditioning air to predetermined locations inside the passenger compartment are connected to the downstream sides of these outlet ports 5 through 7.

Of these, a defroster duct having a defroster outlet for blowing an air conditioning draft toward the inner side of a front windshield in the passenger compartment is connected to a defroster outlet port 5, while a face outlet port 6 branches into a center face outlet port 6a and a side face outlet port 6b and these outlet ports 6a and 6b respectively connect with a center face outlet for blowing air conditioning drafts toward central sides of the upper bodies of front seat occupants and side face outlets for blowing air conditioning drafts toward sides near the respective side windows of the upper bodies of front seat occupants.

A foot outlet passage 8 provided integrally with the resin air-conditioner case 1 is connected to the foot outlet port 7, and in this foot outlet passage 8 are formed a driver's seat outlet 9a for blowing an air conditioning draft toward the feet of a driver's seat occupant and a passenger seat foot outlet 9b for blowing an air conditioning draft toward the feet of a passenger seat occupant.

Also provided in the foot outlet passage 8 is a rear foot outlet port 10, to which is connected a rear foot duct (not shown) having a rear foot outlet for blowing an air conditioning draft toward the feet of rear seat occupants.

Inside the air-conditioner case 1, a first driving shaft 11 and a first driven shaft 12 are supported rotatably with respect to the air-conditioner case 1. The ends of an air-mixing film door 13 made of a flexible material and specifically a resin film material like polyethylene resin having excellent flexibility and strength are joined to and wound around the first driving shaft 11 and the first driven shaft 12.

This air-mixing film door 13 is supported inside the air-conditioner case 1 under a fixed tension by the first driving shaft 11, the heater core 4 and the first driven shaft 12 so that it extends across a warm draft passage 14 passing through the heater core 4 and bypass passages 15, 16 which bypass the heater core 4.

The first driving shaft 11 is rotated by a stepping motor (driving means) (not shown). Openings (not shown) (similar to openings shown in FIG. 2) for air to pass through are formed in the air-mixing film door 13, and by the first driving shaft 11 being rotated in forward and reverse directions and the openings being stopped in required positions by the stepping motor the amount of air passing through the above-mentioned passages 14 through 16 is adjusted.

Inside the air-conditioner case 1, a second driving shaft 17 and a second driven shaft 18 are also supported rotatably with respect to the air-conditioner case 1. The ends of a blow out mode switching film door 20 are joined to and wound around the second driving shaft 17 and the second driven shaft 18. Here, the blowout mode switching film door 20, like the air-mixing film door 13, also consists of a resin film door having good flexibility.

Figure 2:
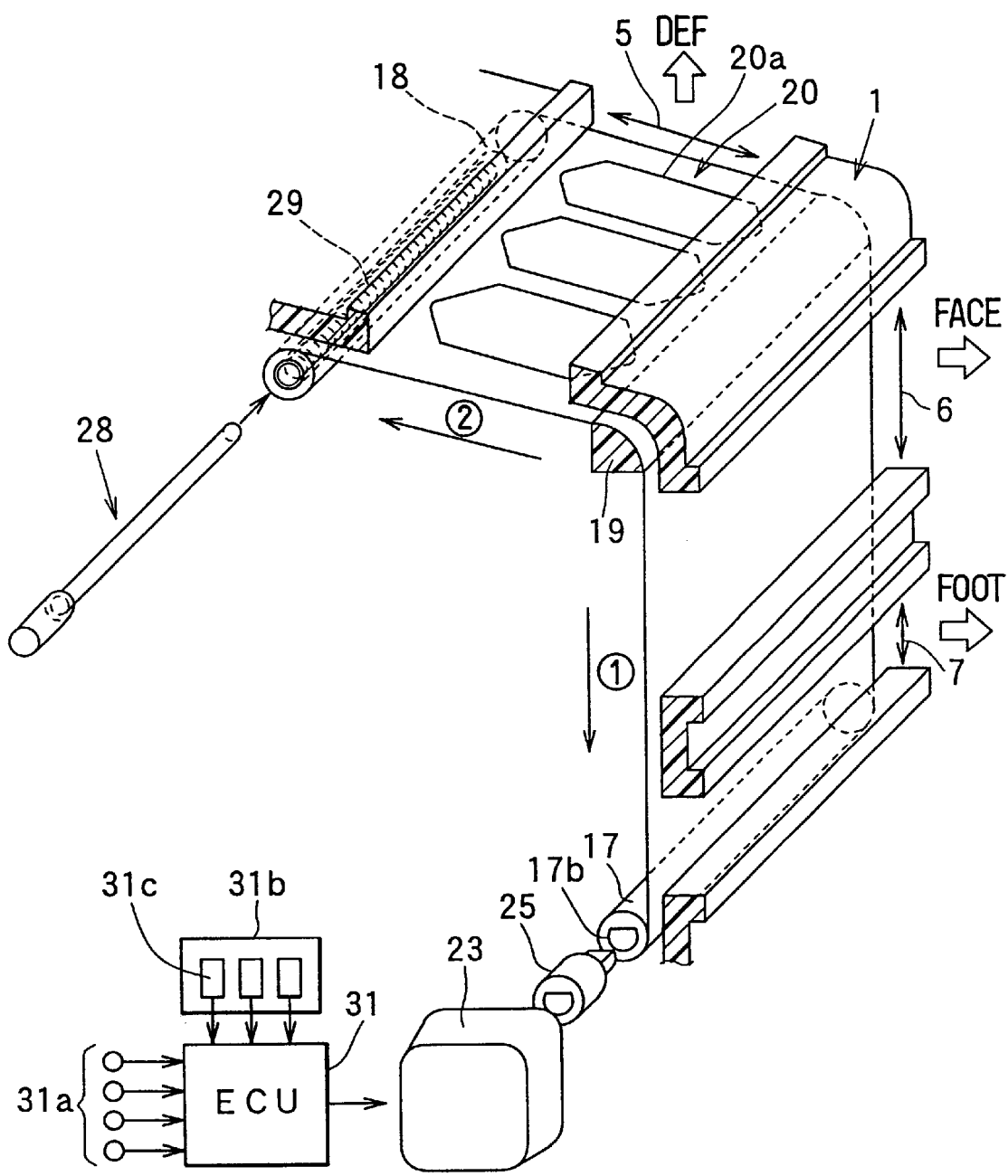
FIG. 2 is an exploded perspective view of a blow out mode selector according to a first preferred embodiment of the present invention.

FIG. 2 is an enlarged view of a drive mechanism of the blow out mode switching film door 20. An intermediate guide shaft 19 is disposed in an intermediate position between the second driving shaft 17 and the second driven shaft 18, and the intermediate guide shaft 19 bends the blow out mode switching film door 20 along inner wall faces of the air-conditioner case 1 and guides the movement of the blow out mode switching film door 20.

Although this intermediate guide shaft 19 may be made rotatable to smooth the movement of the blow out mode switching film door 20, in this example the intermediate guide shaft 19 is made non-rotatable and fixed to the resin air-conditioner case 1 in order to reduce cost.

The blow out mode switching film door 20 is supported under a fixed tension by the second driving shaft 17, the intermediate guide shaft 19 and the second driven shaft 18 so that it faces upstream side wall faces of the outlet ports 5 through 7 and moves along these wall faces.

The second driving shaft 17 is rotated by a stepping motor 23 (driving means) shown in FIG. 2. A plurality of openings 20a for air to pass through are formed in the blow out mode switching film door 20, as shown in FIG. 2, and by the second driving shaft 17 being rotated in forward and reverse directions and these openings 20a being stopped in required positions by the stepping motor 23 the outlet ports 5 through 7 can be opened and closed to switch (select) the blow out mode.

Inside the air-conditioner case 1 there are provided a cool draft bypass passage 21 for guiding a cool draft from the evaporator 3 directly to the face outlet port 6 and a cool draft bypass door 22 for opening and closing this cool draft bypass passage 21. The cool draft bypass door 22 opens the cool draft bypass passage 21 at times of maximum cooling, when the air-mixing film door 13 completely closes the warm draft passage 14 and completely opens the bypass passages 15, 16.

Figure 3:
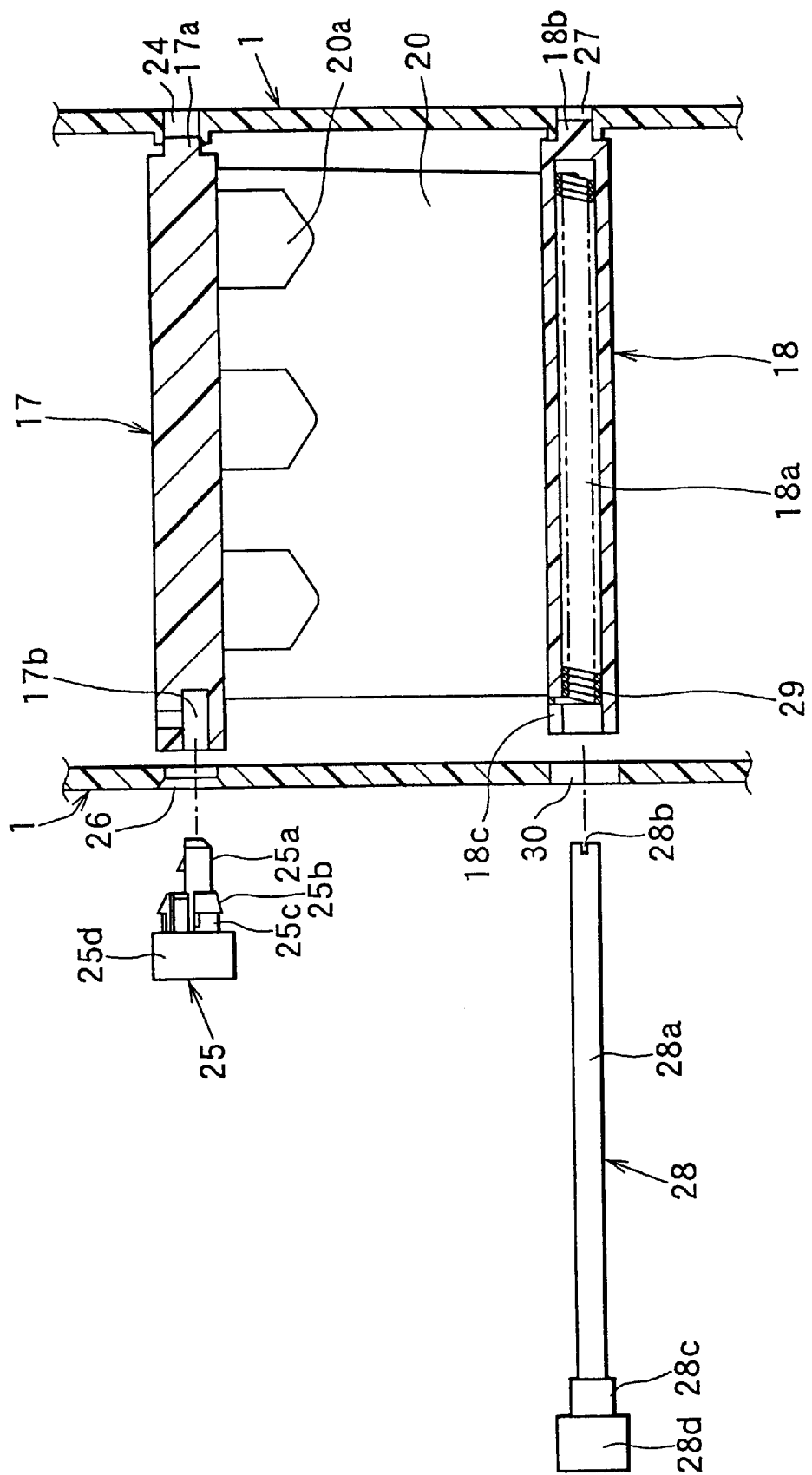
FIG. 3 is an enlarged sectional exploded view of a main part of FIG. 2.
Figure 4:
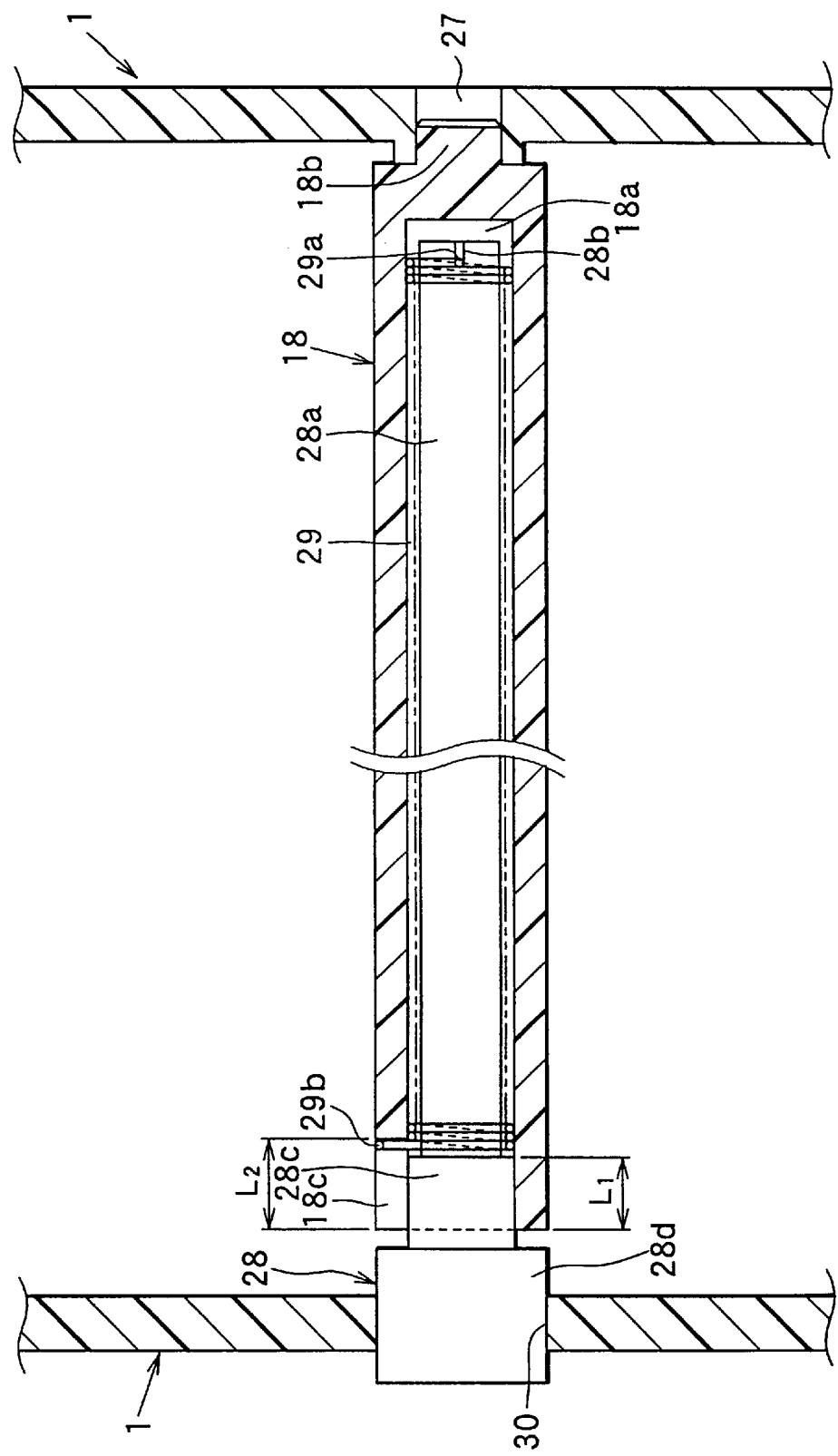
FIG. 4 is an enlarged sectional view of a driven shaft of FIG. 3 in its assembled state.

The specific constitution of the drive mechanism of the blow out mode switching film door 20 will now be described in detail. FIG. 2 through FIG. 4 show details of the drive mechanism of the blow out mode switching film door 20.

The second driving shaft 17 and the second driven shaft 18 are both made of resin, and the ends of the blow out mode switching film door 20 are fixed to the shafts 17, 18 by suitable means such as for example pinching in.

The second driving shaft 17 has an ordinary, non-hollow shaft shape, as shown in FIG. 3. A small-diameter shaft portion 17a is formed on one end of this second driving shaft 17, and this small-diameter shaft portion 17a is rotatably supported by a bearing hole 24 in the air-conditioner case 1.

A cross-sectionally D-shaped linking hole 17b is formed in the other end of the second driving shaft 17, and a cross sectionally D-shaped insert portion 25a of a resin bush 25 is fitted in this linking hole 17b and integrally links the bush 25 and the second driving shaft 17 in the rotation direction.

A fastening claw 25b divided into a plurality of (for example three) parts by slits is provided on the bush 25. This fastening claw 25b is formed around the insert portion 25a with a gap being provided therebetween and is elastically deformable in the radial direction. A root portion 25c of the fastening claw 25b has its external diameter set so that it can fit rotatably in a bearing hole 26 in the air-conditioner case 1.

The bush 25 has a cylindrical main portion 25d disposed outside the air-conditioner case 1, and the above-mentioned insert portion 25a, the fastening claw 25b and the root portion 25c are formed from resin integrally with this main portion 25d.

By the bush 25 being assembled to the second driving shaft 17 and the air-conditioner case 1 in this way, this end of the second driving shaft 17 is rotatably supported in the bearing hole 26 by way of the bush 25. At this time, as a result of the fastening claw 25b, whose diameter is larger than that of the root portion 25c, being provided, positioning of the bush 25 with respect to the air conditioner case 1 can be carried out.

The output shaft of the stepping motor 23 is connected to the main portion 25d of the bush 25, which is disposed outside the air-conditioner case 1, via a suitable speed-reducing gear mechanism. As a result, rotation of the stepping motor 23 is transmitted through the bush 25 to the second driving shaft 17 and the second driving shaft 17 rotates.

The second driven shaft 18, on the other hand, is hollow (tubular) in shape, having an axial cavity 18a at its center. A small-diameter portion 18b is formed on one end of the second driven shaft 18, and this small-diameter portion 18b is rotatably supported in a bearing hole 27 in the air-conditioner case 1. The cavity 18a is closed at this end of the second driven shaft 18 and opens to the outside at the other end (the left end in FIG. 3).

A resin guide bar 28 is inserted into the cavity 18a of the second driven shaft 18. This guide bar 28 has a spring-holding shaft portion 28a, and this spring-holding shaft portion 28a is formed to a minimum diameter so that it forms between itself and the inside of the second driven shaft 18 a gap in which a coil spring 29 can be disposed.

As shown in FIG. 4, the coil spring 29 is coiled around the outside of the spring-holding shaft portion 28a and has one end (the right end in the figures) 29a anchored by being fitted in an anchoring groove 28b in the respective end of the spring-holding shaft portion 28a and thereby fixed to the distal end of the spring-holding shaft portion 28a.

In the guide bar 28, a fitting and support face 28c having a diameter larger by a predetermined amount than the spring-holding shaft portion 28a is formed at the root end of the spring-holding shaft portion 28a; this fitting and support face 28c fits against the inner face of the second driven shaft 18 over a predetermined length $L_1$ shown in FIG. 4, and at this length $L_1$ part the respective end of the second driven shaft 18 is rotatably supported by the guide bar 28.

A slit-like anchoring groove 18c extending in the axial direction over a predetermined length $L_2$ is formed in the same end of the second driven shaft 18. An end portion 29b at the corresponding end of the coil spring 29 is bent radially outward from the circumferential face of the spring-holding shaft portion 28a, and this end portion 29b is anchored by being fitted in the anchoring groove 18c.

Also, a shaft portion for fixing 28d having a maximum diameter is formed integrally with the guide bar 28 so as to continue from the fitting and support face 28c. This shaft portion for fixing 28d is fixed in a fixing hole 30 in the air-conditioner case 1 by means such as press-fitting.

Explaining now the assembly method of the guide bar 28 and the coil spring 29, the coil spring 29 is wound around the spring-holding shaft portion 28a of the guide bar 28 and the end portion 29a of the coil spring 29 is fixed in the anchoring groove 28b at the distal end of the spring-holding shaft portion 28a. The other end 29b of the coil spring 29 is bent radially outward. Then, the spring-holding shaft portion 28a of the guide bar 28 is inserted into the cavity 18a of the second driven shaft 18 through the fixing hole 30 in the air-conditioner case 1.

When the end portion 29b of the coil spring 29 approaches the corresponding end of the second driven shaft 18 as this operation of inserting the spring-holding shaft portion 28a progresses, the end portion 29b is anchored by being fitted in the slit-like anchoring groove 18c of the second driven shaft 18 and moved right to the back of the slit-like anchoring groove 18c in the axial direction (see FIG. 4).

By this means, this end portion 29b of the coil spring 29 is fixed to the respective end of the second driven shaft 18. Simultaneously with this, the shaft portion for fixing 28d of the guide bar 28 is fixed in the fixing hole 30 in the air-conditioner case 1 by means such as press-fitting. As a result, this end of the second driven shaft 18 is rotatably supported by the guide bar 28.

Because in this way one end portion 29a of the coil spring 29 is attached to the guide bar 28 fixed to the air-conditioner case 1 and the other end portion 29b is attached to the second driven shaft 18, which is rotatable with respect to the air-conditioner case 1, the coil spring 29 is forcibly wound up on the spring-holding shaft portion 28a of the guide bar 28 by one-way rotation of the second driven shaft 18. And when a force rotating the second driven shaft 18 in that direction is removed, the coil spring 29 unwinds under its own spring force and rotates the second driven shaft 18 in the other direction (the opposite direction).

Here, in the first preferred embodiment, the relationship between the winding up and unwinding directions of the coil spring 29 and the directions of movement of the blow out mode switching film door 20 is set as follows. That is, FIG. 2 shows a defroster mode state, wherein the openings 20a in the blow out mode switching film door 20 open the defroster outlet port 5; ① shows the direction in which the blow out mode switching film door 20 moves to switch from the defroster mode side to a face mode side, while ② shows the direction in which it moves to switch from the face mode side to the defroster mode side.

Movement of the blow out mode switching film door 20 in the direction ① is carried out by a rotating force of the stepping motor 23 winding one end of the blow out mode switching film door 20 onto the second driving shaft 17. At this time, along with the blow out mode switching film door 20 moving in the direction ①, the second driven shaft 18 rotates, and the wind-up direction of the coil spring 29 is so set that this rotation of the second driven shaft 18 causes the coil spring 29 to elastically deform and be wound up.

Figure 5:
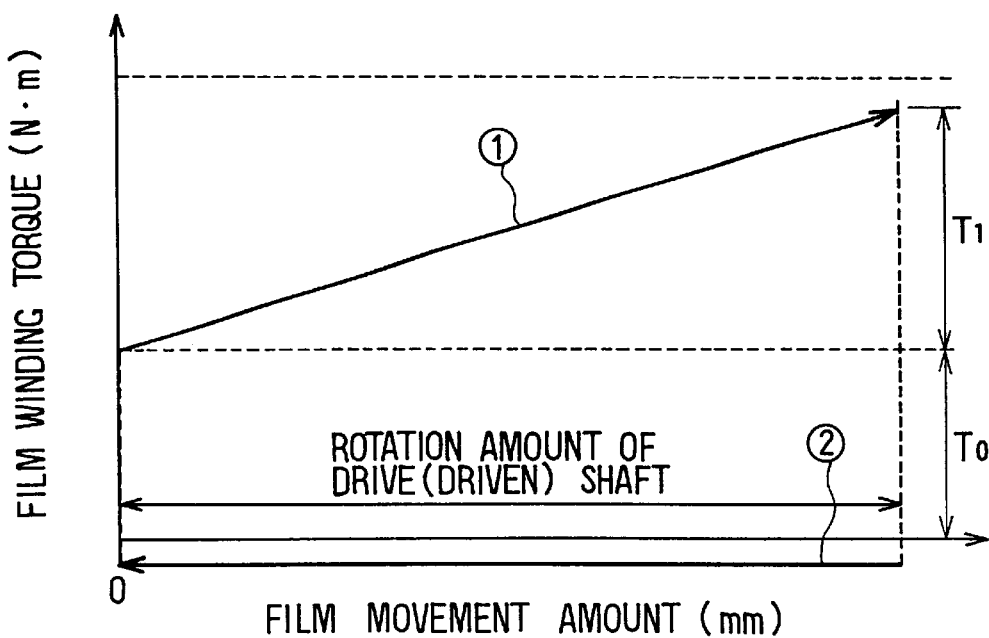
FIG. 5 is chart of film door driving motor operating characteristics, illustrating operation of a related art device and of the present invention.

Accordingly, at the time of a switch from the defroster mode side to the face mode side, because there is an accompanying winding-up of the coil spring 29, the film door winding torque exerted by the stepping motor 23 increases as the distance through which the film door has moved increases, as shown by ① in FIG. 5, and the rotation speed of the stepping motor 23 is decreased.

Movement of the blow out mode switching film door 20 in the direction ② of FIG. 2, on the other hand, is carried out as follows. That is, the stepping motor 23 is rotated in the opposite direction to that mentioned above, the second driving shaft 17 is thus rotated in the opposite direction to before, and the end of the film door 20 is thereby unwound (let out) from the second driving shaft 17. When this happens, since the force in the winding-up direction that had hitherto been acting on the coil spring 29 decreases, the coil spring 29 unwinds under its own spring force.

As a result, because the second driven shaft 18 rotates in the opposite direction to before under the spring force of the coil spring 29 and the other end of the film door 20 is taken up on the second driven shaft 18, the film door 20 moves in the ② direction and switches from the face mode side to the defroster mode side. At the time of this mode switch the film door take-up torque exerted by the stepping motor 23 becomes zero, as shown by ② in FIG. 5, and consequently the rotation speed of the stepping motor 23 increases and the blow out mode switching time is shortened.

Therefore, when an occupant sees that a window is fogging and operates a defroster switch, a switch to defroster mode can be completed rapidly in a short time and defogging of the windows can be carried out swiftly, which is beneficial to ensuring a full field of vision for the driver.

Figure 6:
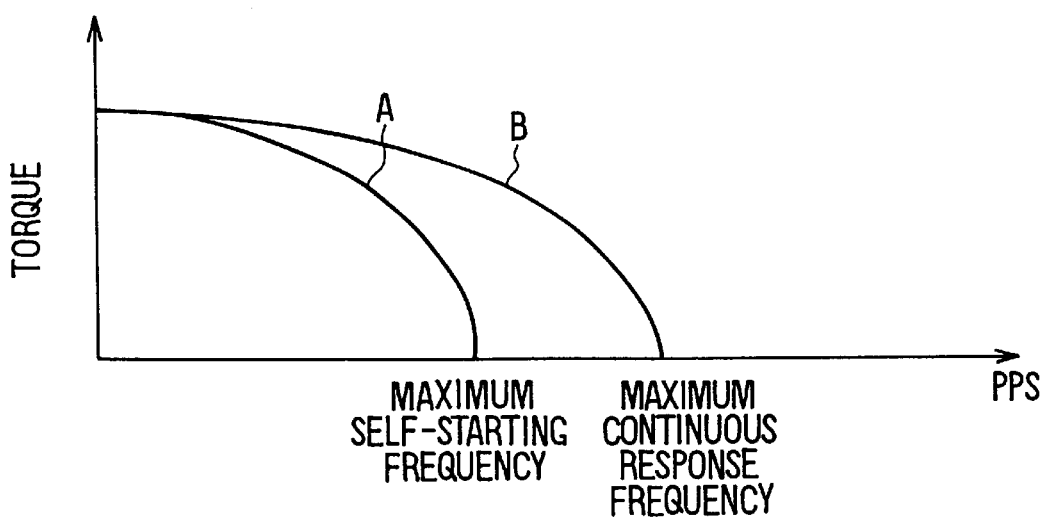
FIG. 6 is an operating characteristic chart showing relationships between torque and pulse rate of a stepping motor used in the present invention.

The stepping motor 23 has its motor rotation (angle of rotation) regulated by pulse number of steps (input pulse count), in a known fashion, and with this stepping motor 23 the torque changes with the pulse rate PPS, which is the pulse count per unit time (one second), as shown in FIG. 6.

In FIG. 6, "A" shows a starting characteristic, which is the torque characteristic of when the motor is started from a static state, and "B" shows a slewing characteristic, which is the torque characteristic that can be followed in the motor rotating state. As can be understood from these characteristics A and B, the stepping motor 23 has the characteristic that when the pulse rate PPS increases, the motor torque decreases and the motor rotation speed increases.

Also, as the stepping motor 23, a PM-type stepping motor using an armature made of permanent magnets can be preferably used. In this case, because by means of the magnetic force of the permanent magnets it is possible to obtain a holding force on the armature even when the stator coils are not being excited, by setting this magnetic force of the permanent magnets to be larger than the spring force of the coil spring 29 at all times, it is possible for the armature position of when the stator coils are not being excited to be held.

Control of the stepping motor 23 is carried out by an air conditioning control unit 31 shown in FIG. 2. This air conditioning control unit 31 is for example made up of a microcomputer and peripheral circuits thereof, and performs predetermined processing in accordance with a preset program to control the electrical devices of the vehicle air conditioning apparatus. In the first embodiment, the amount of rotation (rotation angle) and the rotation direction of the stepping motor 23 are controlled by the air conditioning control unit 31.

Because the stepping motor 23 is driving means of the blow out mode switching film door 20, the amount of rotation (rotation angle) and the rotation direction of the stepping motor 23 are controlled on the basis of a blow out mode signal generated by the microcomputer of the air conditioning control unit 31 or a blow out mode signal manually set by an occupant.

Signals from a set of sensors 31a detecting environmental factors which influence air conditioning inside the passenger compartment such as inside air temperature, outside air temperature, and solar radiation and from a set of control switches 31c of an air conditioning control panel 31b are inputted into the air conditioning control unit 31. Among the control switches 31c of the air conditioning control panel 31b are blow out mode switches including a defroster switch.

Next, an example of control of the stepping motor 23 in this first preferred embodiment will now be described on the basis of the flow chart of FIG. 7. In the control example shown in FIG. 7, it is a premise of control that the direction ② in which the film door moves to switch from the face mode side to the defroster mode side is the direction in which the coil spring 29 unwinds.

Figure 7:
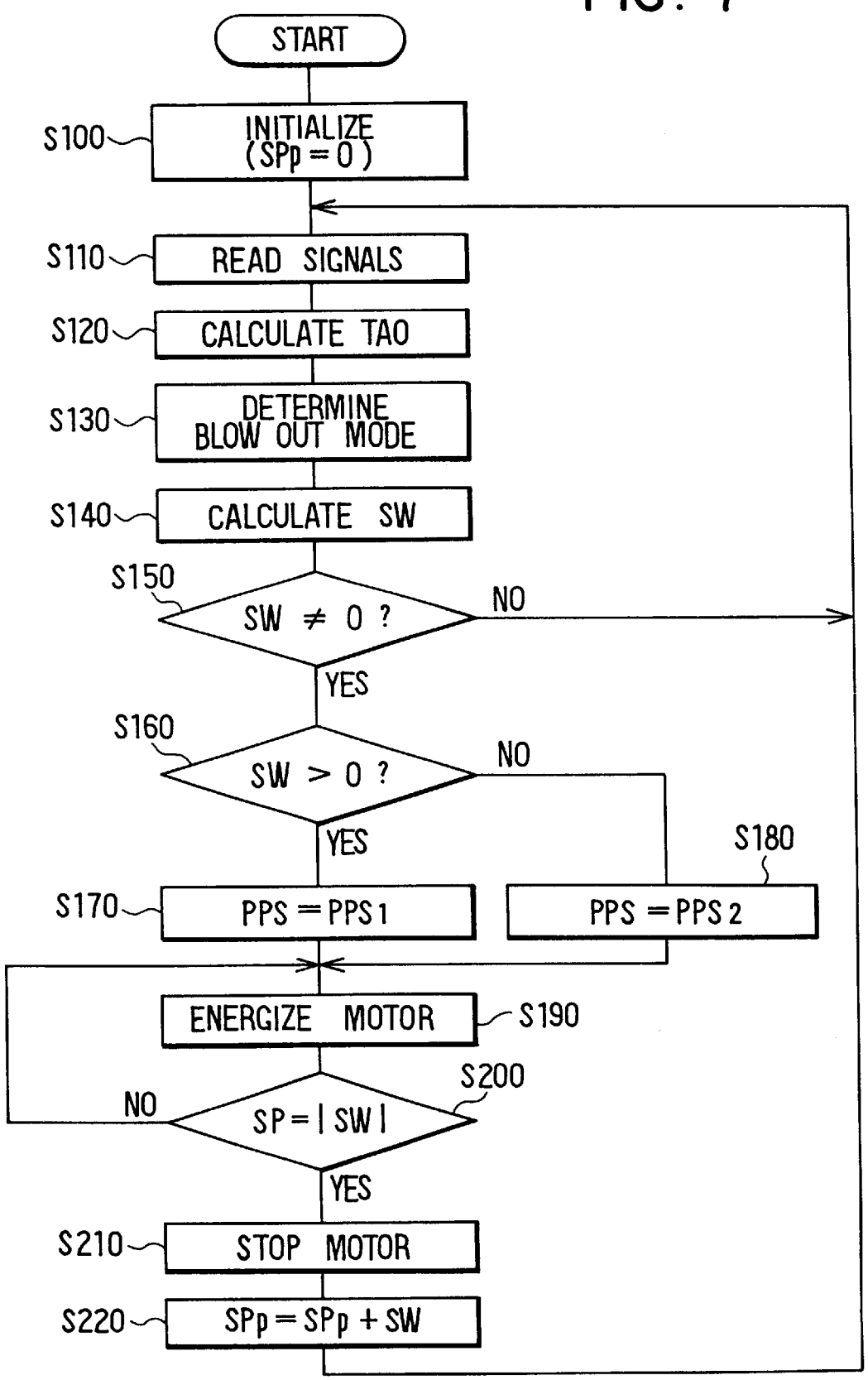
FIG. 7 is a flow chart showing an example of control according to the first preferred embodiment.
Figure 8:
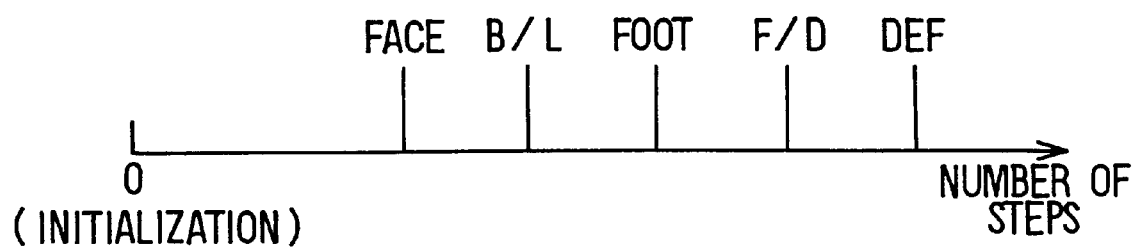
FIG. 8 is a chart illustrating an initialization step of FIG. 7 according to the first embodiment.
Figure 9:
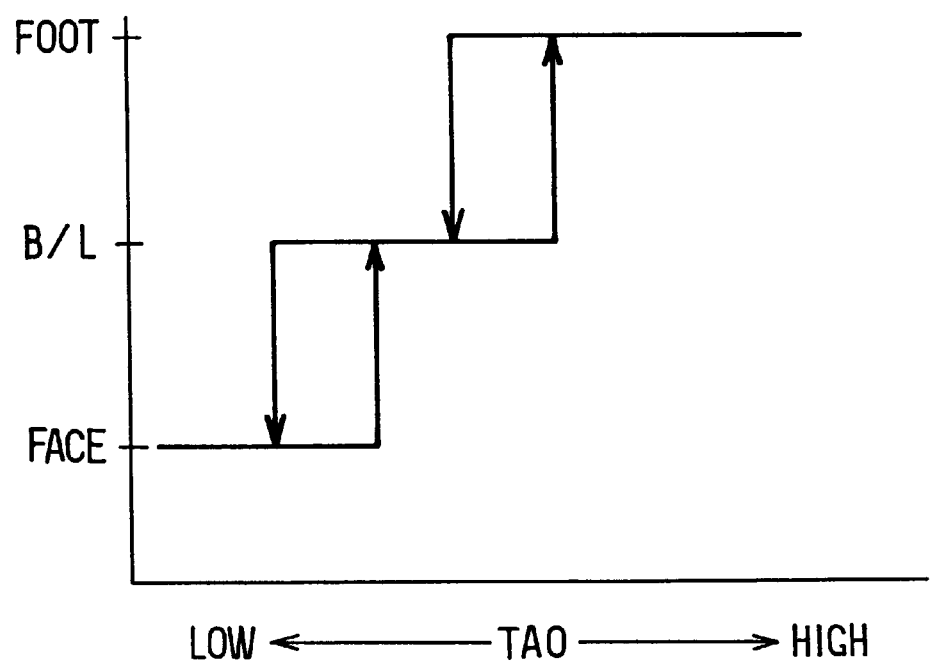
FIG. 9 is a chart illustrating a blow out mode determining step of FIG. 7 according to the first embodiment.

The control routine of FIG. 7 starts when an auto switch or an airflow switch among the control switches 31c of the air conditioning control panel 31b is turned on, and first, in a step S100, a number of steps SPp of the stepping motor 23 is initialized to 0. This initialization of number of steps SPp=0 positions the film door 20 in a predetermined position ahead of the face (FACE) mode position (see FIG. 8). The position of the film door 20 is initialized to the face mode side like this because the direction in which the coil spring 29 unwinds is the direction ② in which the blow out mode switching film door 20 moves to switch from the face mode to the defroster mode.

Next, in step S110, signals from the sensors 31a and the control switches 31c of the air conditioning control panel 31b of FIG. 2 are read in, and in step S120 a target blow out temperature TAO of air blown into the passenger compartment is calculated.

The formula for calculating this TAO is well known, and an blow out temperature necessary for maintaining the temperature inside the passenger compartment at a set temperature set by means of a temperature setting switch among the control switches 31c is calculated taking into account the heat load conditions inside the passenger compartment. This target blow out temperature TAO becomes basic data of air conditioning control.

Then, in step S130, a blow out mode is determined. This blow out mode determination is carried out by one of two different methods. The first is an automatic mode based on the target blow out temperature TAO (see FIG. 9), in which when the target blow out temperature TAO is low the face mode is selected. This face mode is a blow out mode wherein air is blown through the face outlet port 6 (see FIG. 1) toward the upper bodies of occupants.

When the target blow out temperature TAO rises to a first predetermined temperature, a bi-level (B/L) mode is selected. This bi-level mode is a blow out mode wherein air is blown through both the face outlet port 6 and the foot outlet port 7 toward the upper bodies and the feet of occupants.

And when the target blow out temperature TAO increases to a second predetermined temperature higher than the first predetermined temperature, a foot (FOOT) mode is selected. This foot mode is a blow out mode wherein air is blown mainly through the foot outlet port 7 toward the feet of occupants and also a small flow of air is blown through the defroster outlet port 5 toward the inside of the front windshield.

The other method is a manual mode. The control switches 31c of the air conditioning control panel 31b include, as blow out mode switches, a face switch, a bi-level switch, a foot switch, a foot/defroster switch and a defroster switch.

By operating these mode switches by hand, it is possible to set the above-mentioned face, bi-level and toot modes and also a foot/defroster (F/D) mode and a defroster (DEF) mode manually. Since the manual mode consists of blow out mode selection based on the wishes of an occupant, a blow out mode set manually is implemented preferentially over the automatic mode.

The foot/defroster mode is a blow out mode wherein, differently from the foot mode, the flow from the foot outlet port 7 and the flow from the defroster outlet port 5 are made approximately equal. The defroster mode is a blow out mode wherein air is blown through the defroster outlet port 5 toward the inside of the front windshield.

In this way, in step S130, a blow out mode is determined by either the automatic mode or the manual mode, and then a target number of steps SPo corresponding to this blow out mode is determined. This target number of steps SPo is for obtaining the required amount of rotation (rotation angle) of the stepping motor 23, and in this specific example, as shown in FIG. 10, the target number of steps SPo is so determined that it increases as the blow out mode shifts from face to bi-level to foot to foot/defroster to defroster.

Next, in step S140, an output number of steps SW to be actually applied to the stepping motor 23 is calculated using the equation SW=SPo−SPp. Here, in the initial SW calculation following the start of the control routine of FIG. 7, as a result of the initialization in step S100, the value SPp=0 is used in the above equation; however, in subsequent SW calculations, a different number of steps SPp, obtained in a later step S220, which will be discussed hereinafter, corresponding to a different present position of the film door 20, is used in the above equation.

Figures 10, 11:
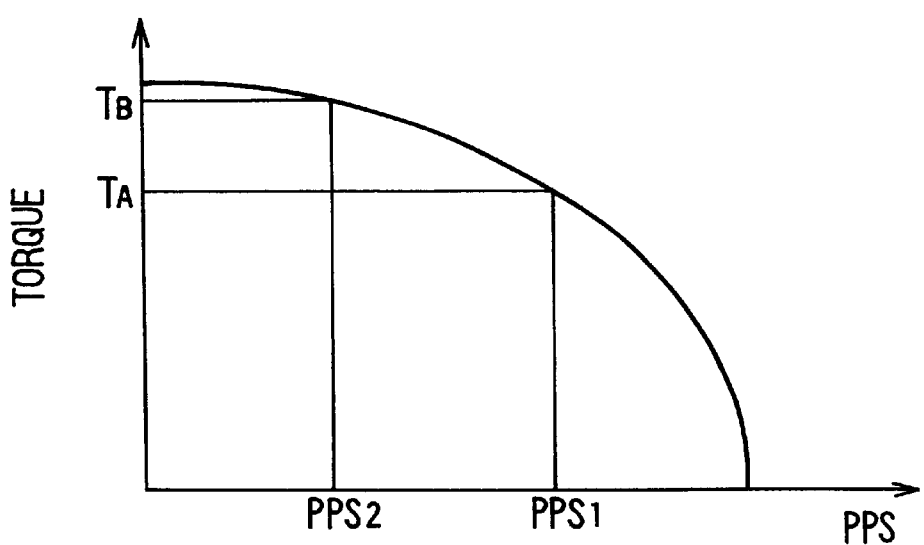
FIG. 10 is a table showing an example relationship between blow out mode and target number of steps according to the first embodiment.
FIG. 11 is a chart illustrating first and second pulse rates according to the first preferred embodiment.

As will be understood from FIG. 10, the output number of steps SW calculated by the equation of SW=SPo−SPp has a positive value for the face side to defroster side mode switch direction and conversely has a negative value for the defroster side to face side mode switch direction. And when the sign of this output number of steps SW changes, the direction of rotation of the stepping motor 23 also changes.

Next, in step S150, it is determined if a change in the blowout mode is required. This determination is made on the basis of whether or not SW≠0. That is, when a change in the blow out mode is required, because the target number of steps SPo always has a value different from the number of steps SPp corresponding to the present position of the film door 20, the determination of step S150 is YES, and processing proceeds to the next step S160. When on the other hand there is no need for a blow out mode change, SPo=SPp and therefore SW=0 and processing returns to step S110.

In step S160, it is determined whether or not the blow out direction of movement of the film door 20 (the blow out mode switching direction) is the direction in which it moves from the face side to the defroster side (the direction in which the coil spring 29 unwinds). As will be understood from the foregoing explanation of step S140, this determination can be made on the basis of whether or not the output number of steps SW has a positive value (SW>0).

When the required movement direction (blowout mode switching direction) of the film door 20 is the face side to defroster side direction, processing proceeds to step S170 and sets the pulse rate PPS of the input pulse of the stepping motor 23 to a first predetermined value $PPS_1$. When the required movement direction (blow out mode switching direction) of the film door 20 is the defroster side to the face side direction (the direction in which the coil spring 29 is wound up), processing proceeds to step S180 and sets the pulse rate PPS to a second predetermined value $PPS_2$.

Here, as shown in FIG. 11 (a torque characteristic like those of FIG. 6) the first and second predetermined values $PPS_1$ and $PPS_2$ have the relationship $PPS_1 > PPS_2$. Therefore, the corresponding motor torques have the relationship torque $T_A$ at $PPS_1$ is less than torque $T_B$ at $PPS_2$.

That is, when the required movement direction of the film door 20 is the face side to defroster side direction, because this is the direction in which the coil spring 29 unwinds, the motor torque can be low.

Therefore, the pulse rate PPS can be set to the first predetermined value $PPS_1$, providing a low motor torque, without any problem. Rather, when the pulse rate is set to the first predetermined value $PPS_1$ larger than the second predetermined value $PPS_2$ like this, the rotation speed of the stepping motor 23 increases and the switch to the defroster mode can be made rapidly, and this is advantageous in the actual use.

When on the other hand the direction of the required movement of the film door 20 is the defroster side to face side direction, because this is the direction in which the coil spring 29 is wound up, to move the film door 20 a force for winding up the coil spring 29 ($T_1$ in FIG. 5) also becomes necessary.

Consequently, if the motor torque is not increased, the torque of the stepping motor 23 may be inadequate. To prevent this, in the first embodiment, when the movement direction is the defroster side to face side direction mentioned above, the pulse rate PPS is set to the second predetermined value $PPS_2$, lower than the first predetermined value $PPS_1$, whereby the motor torque is automatically increased from $T_A$ to $T_B$ and a shortage of torque is prevented.

Next, in step S190, pulse driving (excitation of the motor stator coils) of the stepping motor 23 is carried out, and counting of the pulse number of steps SP actually outputted starts.

In step S200 it is determined whether or not this actual outputted number of steps SP has reached the output number of steps SW (an absolute value) in step S140, and when SP=SW is reached, because the movement of the film door 20 for blow out mode switching is finished, processing proceeds to step S210 and stops the pulse driving of the stepping motor 23.

Then, in step S220, the number of steps SPp is updated according to the equation SPp=SPp (previous value)+SW to correspond to the new present position of the film door 20.

As the motor torque characteristic of FIG. 11, preferably the motor torque characteristics A and B of FIG. 6 are switched between so that for times of motor start-up the starting characteristic A of FIG. 6 is used, and for the rotating state (steady operation state) after the end of motor start-up the slewing characteristic B is used. In this case, in the rotating state after the end of motor start-up the range over which the pulse rate PPS can be adjusted is larger and it is easier to effect torque adjustment and motor rotation speed adjustment at the same time.

In the first embodiment of the present invention, a DC motor may be substituted for the stepping motor 23. In this case, when the movement direction is the defroster side to face side direction, that is, when the movement direction is to wind up the coil spring 29, an applied voltage applied to the DC motor is greater than that when the movement direction is to unwind the coil spring 29, whereby the motor torque is automatically increased from $T_A$ to $T_B$ and a shortage of torque is prevented.

(Second Embodiment)

Figure 12:
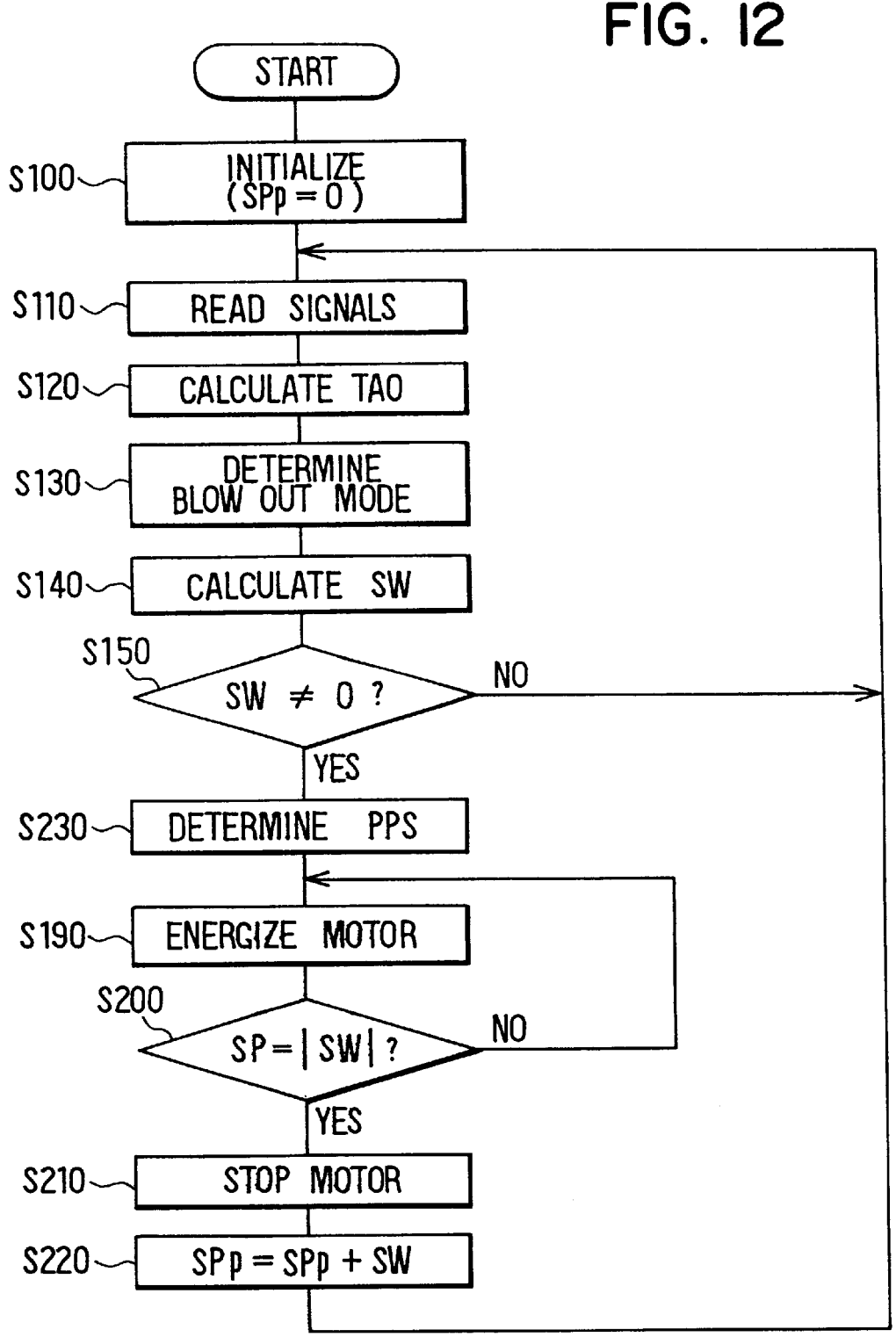
FIG. 12 is a flow chart showing an example of control according to a second preferred embodiment of the present invention.
Figure 13:
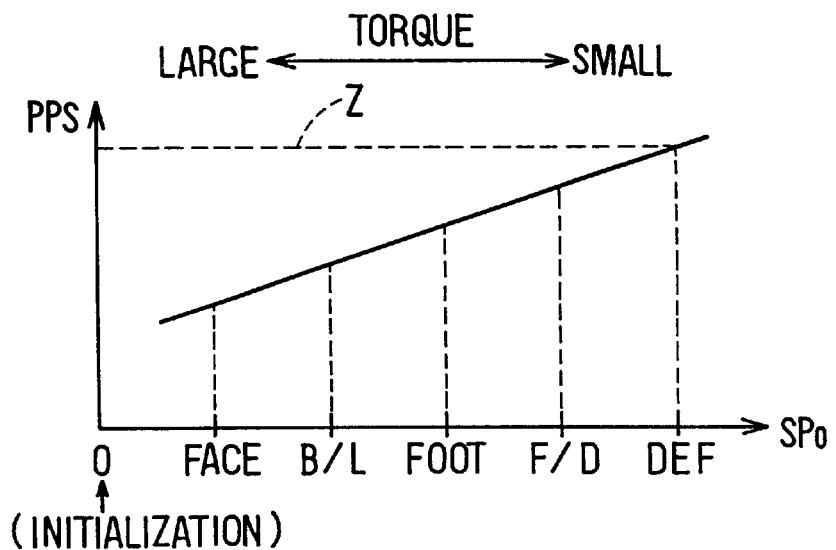
FIG. 13 is a chart illustrating a pulse rate determining method according to the second preferred embodiment.

FIG. 12 and FIG. 13 illustrate a second preferred embodiment of the present invention, which differs from the first preferred embodiment only in the point that a step S230 is provided instead of the steps S160 through S180 for determining the pulse rate PPS in the first preferred embodiment, and in all other respects is the same as the first preferred embodiment. The method for determining the pulse rate PPS used in step S230 is illustrated in FIG. 13.

In this and the following embodiments, components which are substantially the same as those in previous embodiments are assigned the same reference numerals.

In step S130, a target number of steps SPo corresponding to a blow out mode is determined in the same way as in the first preferred embodiment. This target number of steps SPo increases as the blow out mode shifts from the face mode to the defroster mode side. In step S230, the pulse rate PPS is varied as shown in FIG. 13 in correspondence with variation in the target number of steps SPo.

That is, because the mode switching direction of from the defroster side to the face side is the direction in which the coil spring 29 winds up, the required motor torque increases as the distance moved by the film door 20 from the defroster mode position increases, and accordingly the pulse rate PPS is gradually reduced in correspondence with this increasing of the required motor torque. By this means it is possible to make the motor torque gradually increase as the film door 20 shifts from the defroster mode position to the face mode side.

Also, when the blow out mode is switched back in the direction of from the face side to the defroster side, because the pulse rate PPS is gradually increased, the motor torque gradually decreases as the blow out mode switching film door 20 shifts to the defroster side.

When the blow out mode is switched in the direction of from the face side to the defroster side, because this is the direction in which the coil spring 29 unwinds, the switching film door 20 can be made to move under the spring force of the coil spring 29. Therefore, because the motor torque may be small, when the blow out mode is switched in the face side to defroster side switch direction, the pulse rate PPS may be uniformly set to a large value as shown by the line Z in FIG. 13 and the motor torque thereby made small so that the motor speed is always high.

In the second embodiment, a DC motor may be substituted for the stepping motor 23. In this case, when the blow out mode is switched from the defroster side to the face side such that the coil spring 29 winds up, an applied voltage applied to the DC motor is gradually increased in correspondence with the increasing of the required motor torque. By this means it is possible to make the motor torque gradually increase as the film door 20 shifts from the defroster mode position to the face mode side.

(Third Embodiment)

Figure 14:
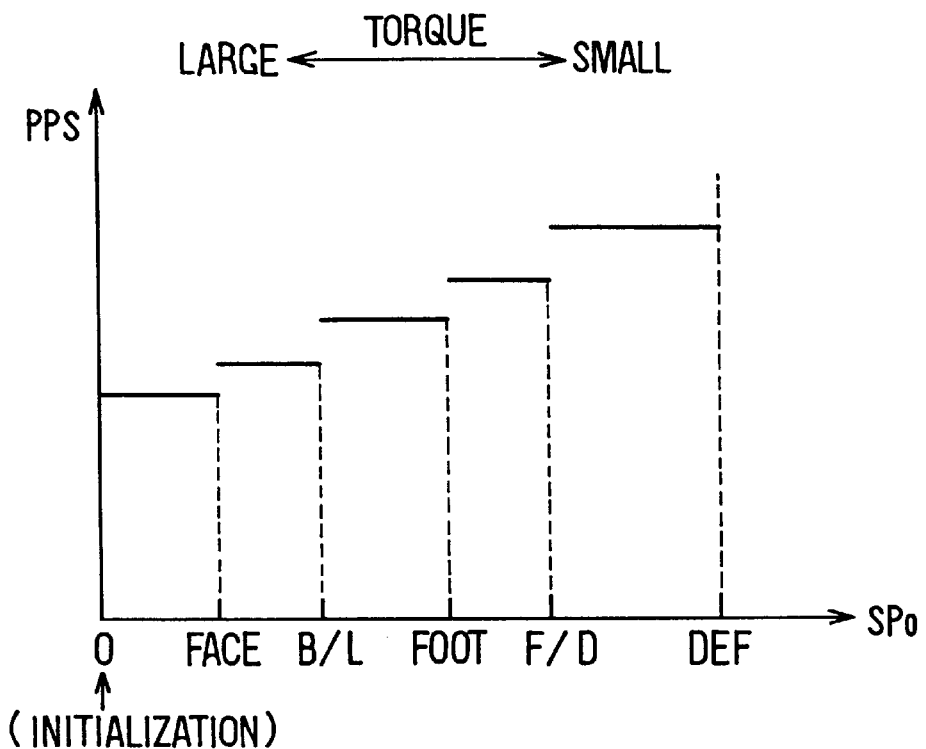
FIG. 14 is a chart illustrating a pulse rate determining method according to a third preferred embodiment of the present invention.

FIG. 14 illustrates a third preferred embodiment of the present invention. Whereas in the second preferred embodiment the pulse rate PPS was changed in step S230 continuously in correspondence with the target number of steps SPo for determining the blow out mode, in this third preferred embodiment the pulse rate PPS is made to change stepwise on the basis of the target number of steps SPo corresponding to the different blow out modes.

As a modified version of the third preferred embodiment, the pulse rate PPS may be made to change stepwise every time the target number of steps SPo changes by a predetermined number (for example ten steps).

(Other Modifications)

[1] In the first through third preferred embodiments described above, the pulse rate PPS of the stepping motor 23 is changed between the two cases of when the blow out mode switching film door 20 is to be moved in the mode switching direction of from the defroster side to the face side (the direction in which the coil spring 29 is wound up) and when conversely the blow out mode switching film door 20 is to be moved in the mode switching direction of from the face side to the defroster side (the direction in which the coil spring 29 unwinds); however, the pulse rate PPS may alternatively be switched in size between the above-mentioned automatic mode of blow out mode determination based on the TAO and the above-mentioned manual mode based on a manual control operation carried out by an occupant.

For example, in the case of the manual mode based on a manual control operation performed by an occupant, the pulse rate PPS may be made large, to further increase the blow out mode switching speed. By this means, it is possible for blow out mode switching to be executed more rapidly in the case of the manual mode compared to the automatic mode.

In particular, when the defroster mode is set in the manual mode, a maximum pulse rate PPS, larger than that for any of the other mode settings, may be set, so that the defroster mode can be implemented rapidly at a maximum speed. In this case, after an occupant sets the defroster mode, defogging of the windshield by the defroster mode can be started substantially instantaneously and the forward field of vision can be secured swiftly, which is beneficial to the safety of the vehicle.

In the case of the automatic mode based on the TAO, on the other hand, the pulse rate PPS can be made smaller than in the case of the manual mode, to reduce the blow out mode switching speed. By this reduction in the blow out mode switching speed it is possible to reduce the operating noise of the film door 20 in the automatic mode and to reduce tonal change of the operating noise of the film door 20. This is beneficial to reduce the noise in the passenger compartment in the case of the automatic mode.

Although only a case wherein the foot/defroster mode and the defroster mode are set manually, in the manual mode, was described in the first preferred embodiment, it is also possible for the foot-defroster mode and the defroster mode to be set automatically, in the automatic mode, for example on the basis of a signal from a windshield fogging sensor or a temperature sensor inside the passenger compartment.

[2] Although in the first preferred embodiment a specific description of the driving mechanism of the air-mixing film door 13 was omitted, if a stepping motor (not shown) is connected to the first driving shaft 11 and a coil spring (not shown) is connected to the first driven shaft 12, the movement of the air-mixing film door 13 can be controlled by means of the rotating drive of the stepping motor and the spring force of the coil spring in the same way as the blow out mode switching film door 20.

In the case of this air-mixing film door 13 also, when the air-mixing film door 13 is to be moved in the direction in which it winds up the coil spring, the pulse rate PPS may be decreased or the DC motor applied voltage may be increased to increase the motor torque. And conversely when the air-mixing film door 13 is to be moved in the direction in which the coil spring unwinds, the pulse rate PPS may be increased or the DC motor applied voltage may be decreased to decrease the motor torque.

However, because the air-mixing film door 13 is for continuously controlling the aperture of the warm draft passage 14 and the apertures of the bypass passages 15 and 16, it is not necessary for the movement directions of the air-mixing film door 13 and the winding-up and unwinding directions of the coil spring 29 to be set in a particular relationship.

[3] Whereas in the first preferred embodiment a coil spring 29 disposed inside a cavity 18a in the second driven shaft 18 is used as the elastic means connected to the second driven shaft 18, alternatively a flat spiral spring with a spiral winding shape having an external diameter larger than that of the second driven shaft 18 can be used. In this case, the flat spiral spring may be disposed outside the air-conditioner case 1 and the inner end of the flat spiral spring may be directly or indirectly connected outside the air-conditioner case 1 to one end of the second driven shaft 18 so that the spring force of the flat spiral spring acts on the second driven shaft 18.

(Fourth Embodiment)

Figure 15:
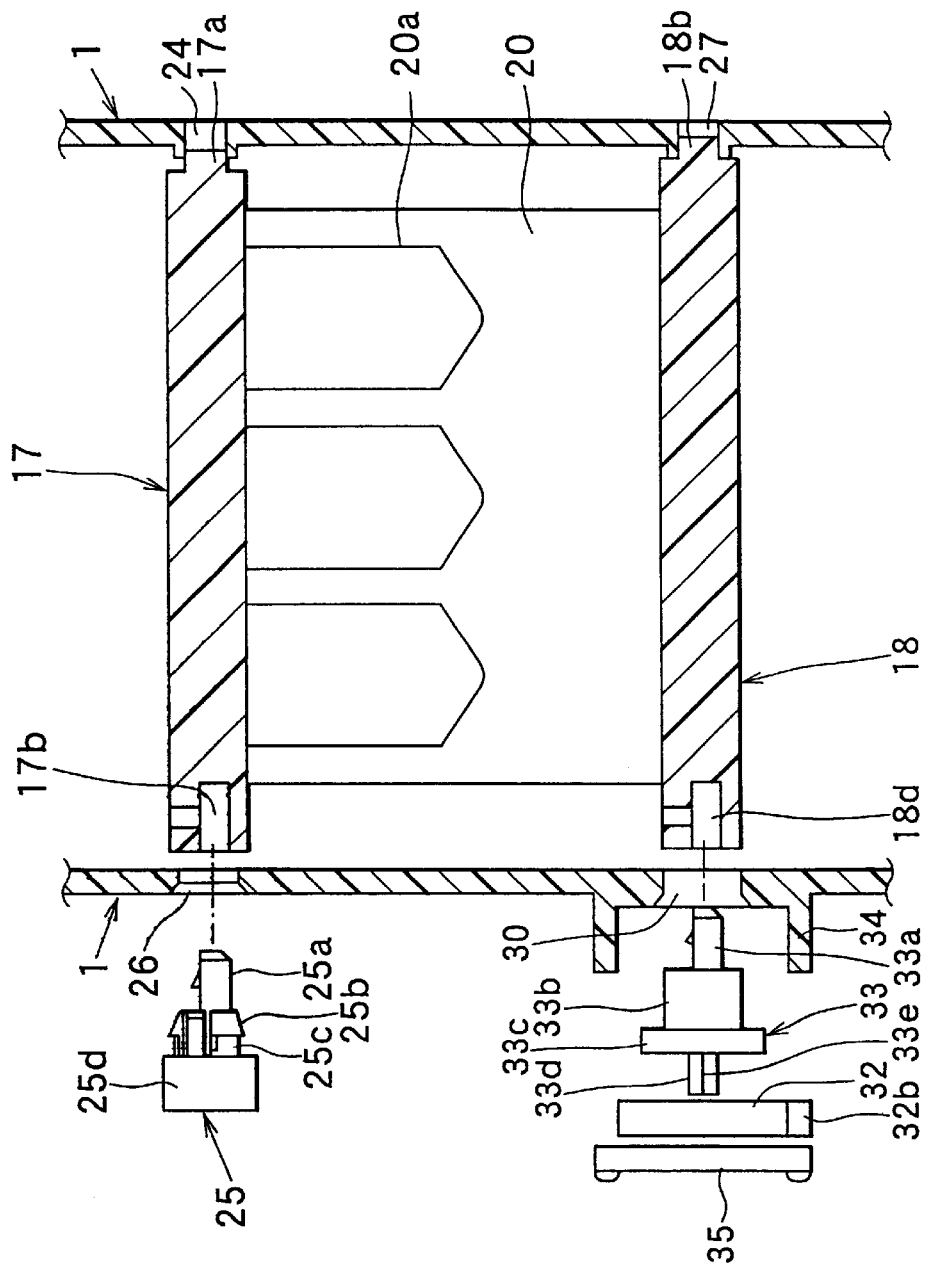
FIG. 15 is an exploded sectional view of a blow out mode selector according to a fourth preferred embodiment of the present invention.
Figure 16:
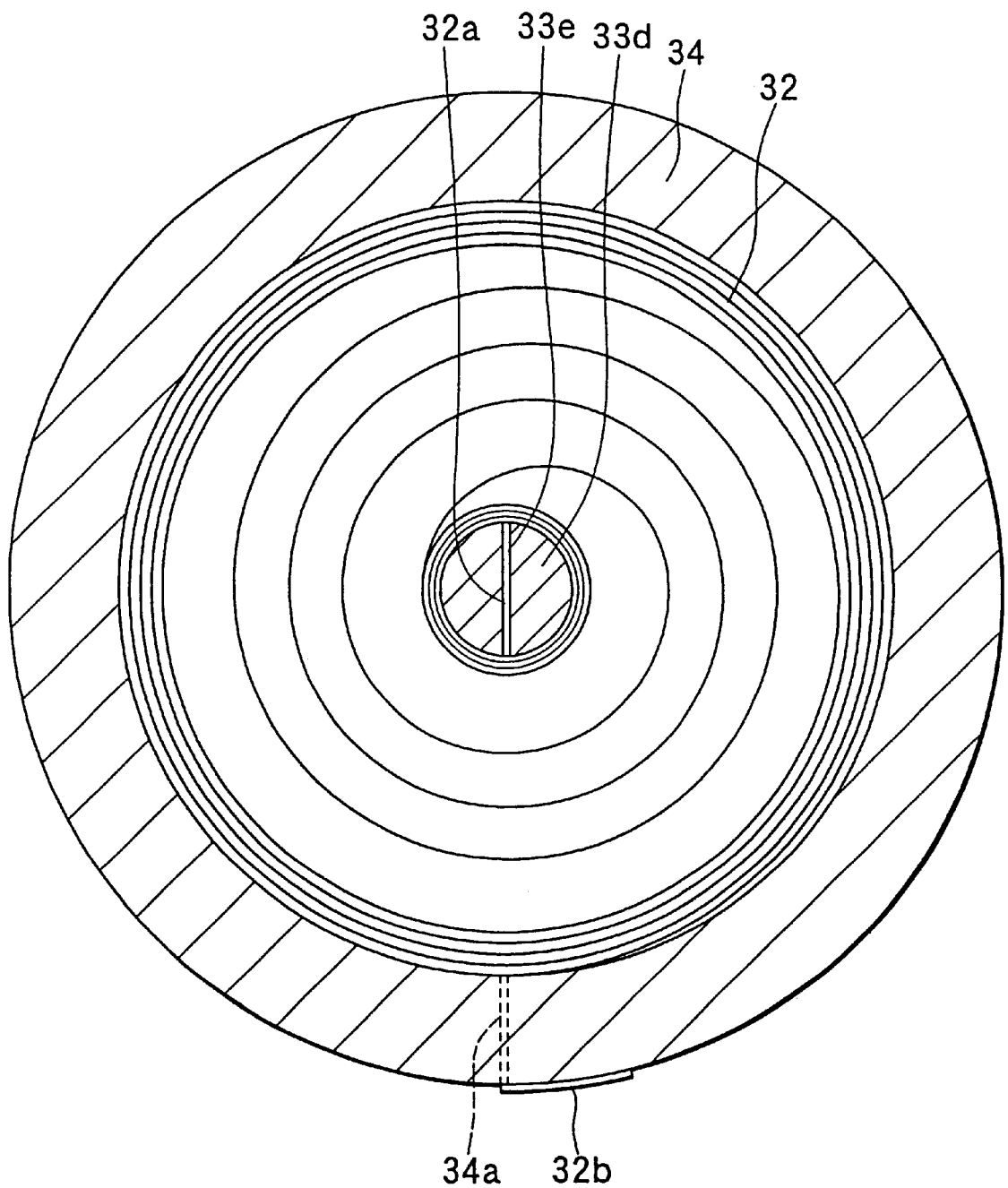
FIG. 16 is an enlarged sectional view showing an assembled condition of a coil spring in FIG. 5 according to the fourth preferred embodiment.
Figure 17:
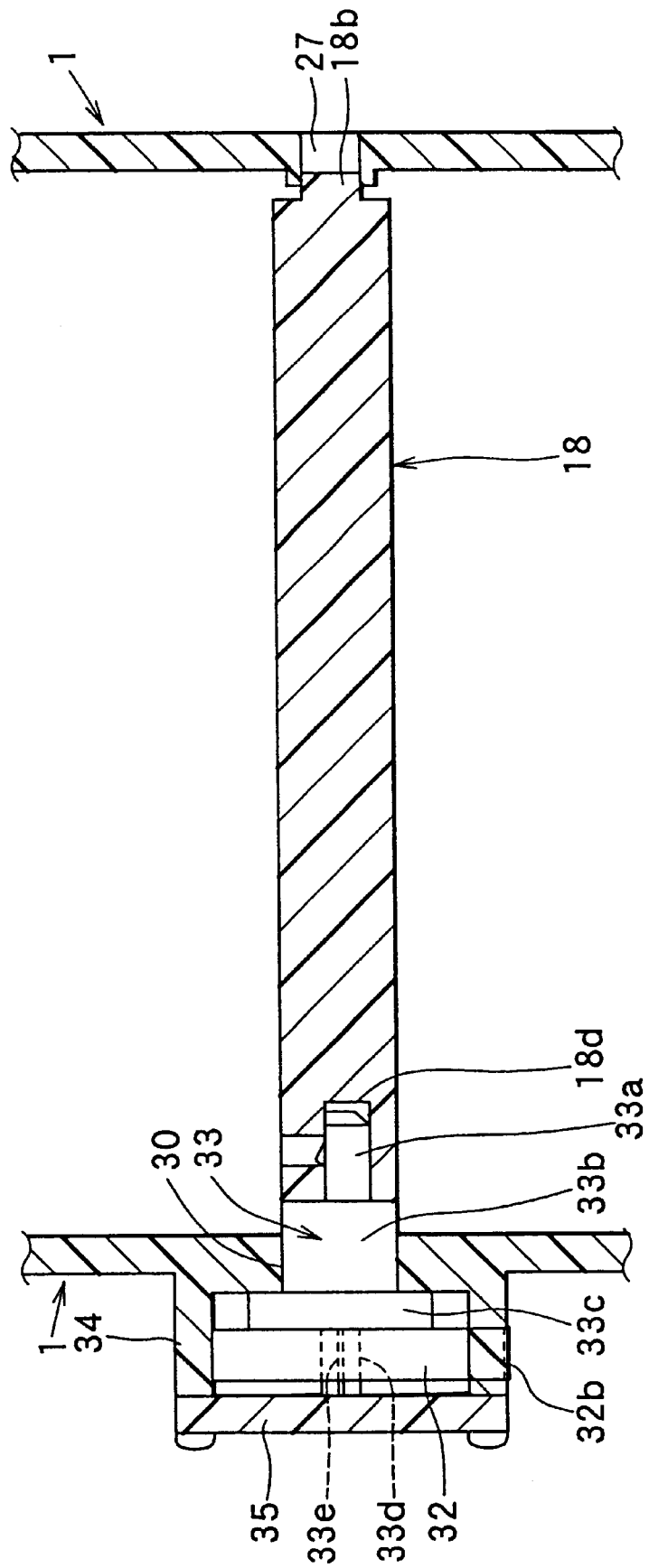
FIG. 17 is an enlarged sectional view showing an assembled condition of a driven shaft in FIG. 5 according to the fourth preferred embodiment.

FIG. 15 through FIG. 17 show a fourth preferred embodiment of the present invention. Whereas in the first preferred embodiment a coil spring 29 disposed inside a cavity 18a in the second driven shaft 18 is used as the elastic member connected to the second driven shaft 18, in this fourth preferred embodiment a flat spiral spring (power spring) 32 having an external diameter larger than the external diameter of the second driven shaft 18 is used. Here, the flat spiral spring 32 is a spring wound in a spiral in a single flat plane, as shown in FIG. 16.

Parts in FIG. 15 through FIG. 17 the same as or equivalent to parts in the first preferred embodiment will not be described again here. In the fourth preferred embodiment, since the flat spiral spring 32 is disposed on the outside of the air-conditioner case 1, the second driven shaft 18 does not need to be made hollow and has an ordinary shaft shape like that of the second driving shaft 17. Because of this the guide bar 28 in the first preferred embodiment is dispensed with, and in its place a bush 33 similar to the bush 25 for the second driving shaft 17 is disposed at the end of the second driven shaft 18.

That is, a cross-sectionally D-shaped connecting hole 18d is formed in the end of the second driven shaft 18, a cross-sectionally D-shaped insert portion 33a of a bush 33 made of resin is fitted in this connecting hole 18d, and the bush 33 and the second driven shaft 18 are thereby connected integrally with respect to the rotation direction. A support shaft portion 33b is molded integrally with the bush 33, and by this support shaft portion 33b being rotatably fitted inside a fixing hole 30 in the air-conditioner case 1 the respective end of the second driven shaft 18 is rotatably supported in the fixing hole 30 by way of the bush 33.

Also, a disc portion 33c having an external diameter amply larger than that of the support shaft portion 33b is formed on the bush 33, and a small-diameter mounting shaft portion 33d is formed in the center of the disc portion 33c on the opposite side thereof from the support shaft portion 33b.

As shown in FIG. 16, an anchoring groove 33e is formed passing through this mounting shaft portion 33d in the diametral direction and the inner end 32a of the flat spiral spring 32 is anchored by being fitted in this anchoring groove 33e, whereby the inner end 32a of the flat spiral spring 32 is fixed to the mounting shaft portion 33d.

A spring-receiving enclosure 34 projecting outward in the shape of a cylinder is formed integrally with the air-conditioner case 1 around the fixing hole 30, and the flat spiral spring 32 is received inside this spring-receiving enclosure 34.

As shown in FIG. 16, an anchoring hole 34a is provided passing radially through this spring-receiving enclosure 34, and by the outer end 32b of the flat spiral spring 32 being fitted in this anchoring hole 34a and then bent back along the outer face of the spring-receiving enclosure 34 the outer end 32b is fixed to the spring-receiving enclosure 34.

Also, a disc-shaped cap member 35 is removably attached to the open end of the spring-receiving enclosure 34 by suitable means such as screws. The assembled position of the bush 33 is held by the disc portion 33c of the bush 33 abutting with the bottom of the spring-receiving enclosure 34 and the end of the mounting shaft portion 33d abutting with the inner face of the cap member 35.

This fourth preferred embodiment is also so configured that the flat spiral spring 32 is wound up in the movement direction ① in which the blow out mode switching film door 20 moves to switch from the defroster mode to the face mode and the flat spiral spring 32 unwinds under its own spring force in the movement direction ② in which the blow out mode switching film door 20 moves to switch from the face mode to the defroster mode.

As a result, during switching from the face mode to the defroster mode the film door take-up torque required of the stepping motor 23 becomes zero, and the speed of the stepping motor 23 increases, and the blow out mode switching time is shortened.

(Fifth Embodiment)

Figure 18:
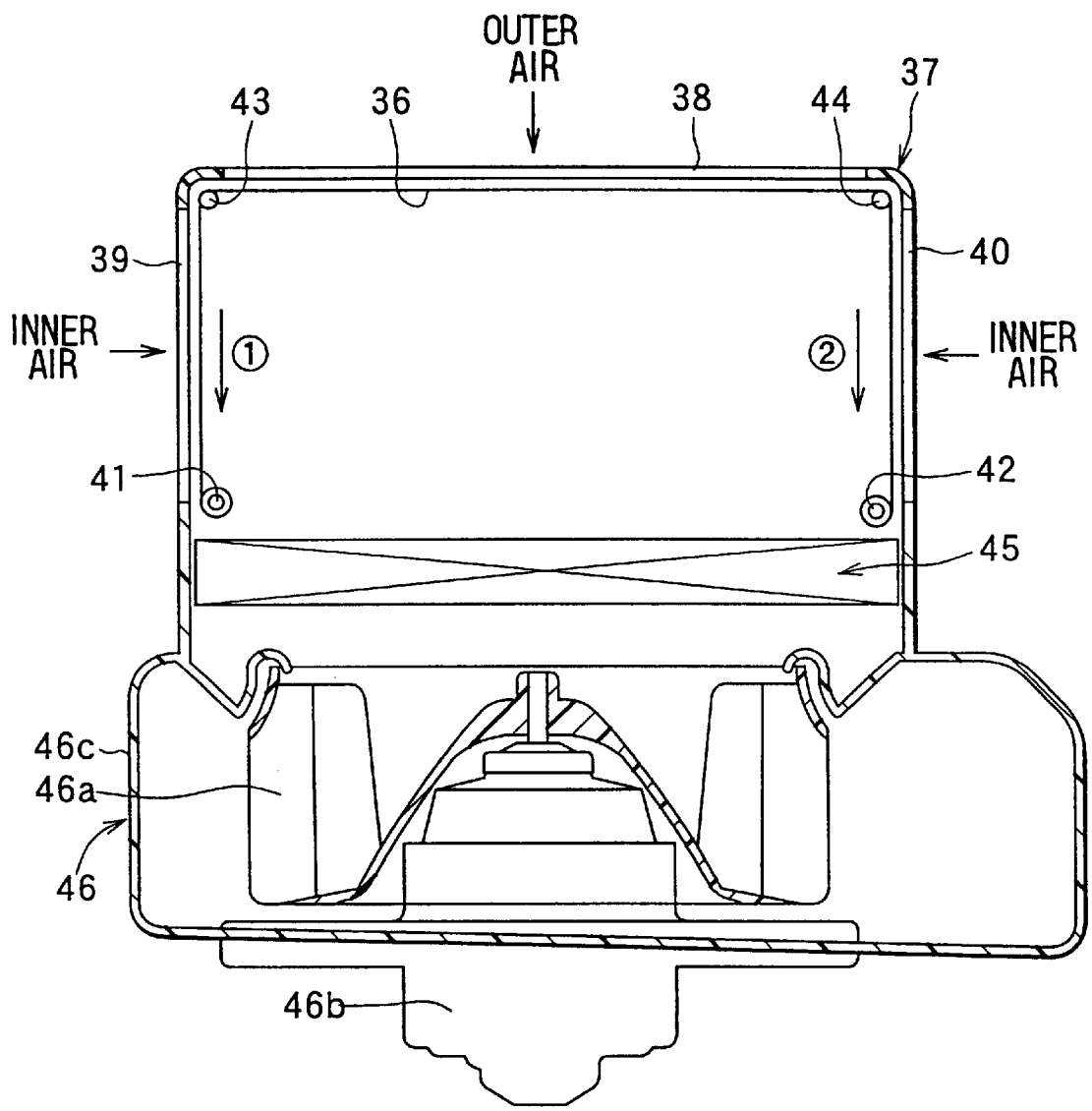
FIG. 18 is a sectional view of an air inlet mode selector according to a fifth embodiment of the present invention.

FIG. 18 shows a fifth preferred embodiment of the present invention. Whereas in the first through fourth preferred embodiments described above the invention was applied to the driving mechanism of a blow out mode switching film door 20, in this fifth preferred embodiment the invention is applied to the driving mechanism of an inside/outside air switching film door 36.

In FIG. 18, one outside air inlet 38 for introducing outside air and two inside air inlets 39, 40 for introducing inside air are provided in an inside/outside air switching box (case member) 37, and inside the inside/outside air switching box 37 an inside/outside air switching film door 36 is disposed so as to be movable along the inner sides of the outside air inlet 38 and the inside air inlets 39, 40.

This inside/outside air switching film door 36 has openings able to communicate with the inlets 38 through 40, and has one end connected to a third driving shaft 41 and the other end connected to a third driven shaft 42. Furthermore, the middle part of the inside/outside air switching film door 36 is guided by two intermediate guide shafts 43 and 44.

The third driving shaft 41 is rotated by a stepping motor (not shown) and the third driven shaft 42 is rotated by elastic means such as a coil spring 29 according to the first preferred embodiment or a flat spiral spring 32 according to the fourth preferred embodiment.

By movement of the film door 36 it is possible to switch between an outside air mode, in which only the outside air inlet 38 is opened, and an inside air mode, in which only the inside air inlets 39, 40 are opened. Here, as necessary, it is also possible to set an inside/outside air mixing mode, in which the outside air inlet 38 and the inside air inlets 39, 40 are all opened in predetermined proportions.

Now, there are cases where, when as the inside/outside air mode of a vehicle air conditioning apparatus the outside air mode is set, because for example from the exhaust gas of a preceding vehicle polluted or malodorous air has begun to be introduced into the passenger compartment, an occupant wishes to switch to the inside air mode immediately.

In this connection, in this fifth preferred embodiment, during switching from the inside air mode to the outside air mode, the third driving shaft 41 is rotated by the stepping motor and the film door 36 is moved in the direction ① of FIG. 18 and the elastic member connected to the third driven shaft 42 is wound up.

Conversely, during switching from the outside air mode to the inside air mode, the third driving shaft 41 is rotated by the stepping motor in the opposite direction and the elastic member connected to the third driven shaft 42 unwinds under its own spring force. The third driven shaft 42 is rotated by this spring force of the elastic member, and the film door 36 is moved in the direction ② of FIG. 18 to effect the switch from the outside air mode to the inside air mode.

According to the fifth embodiment of the present invention, switching from the outside air mode to the inside air mode can be carried out rapidly in a short time, the introduction of polluted or malodorous air into the passenger compartment can be minimized, and the wishes of occupants can be satisfied.

In vehicle air conditioning apparatuses there also are cases where, in the reverse of the foregoing, to defog the windshield, it is desirable for switching from the inside air mode to the outside air mode to be carried out more rapidly than switching from the outside air mode to the inside air mode. This requirement can be satisfied by so designing the apparatus that the film door 36 is moved by the spring force of the elastic means at times of switching from the inside air mode to the outside air mode.

In FIG. 18, the reference numeral 45 represents a dust filter, and a blower 46 is made up of a centrifugal blower fan 46a, a fan motor 46b, and a scroll case 46c. Air delivered by the blower fan 46a flows through an outlet in the scroll case 46c into the air inlet 2 of the air-conditioner case 1 of FIG. 1.

(Sixth Embodiment)

Figure 19:
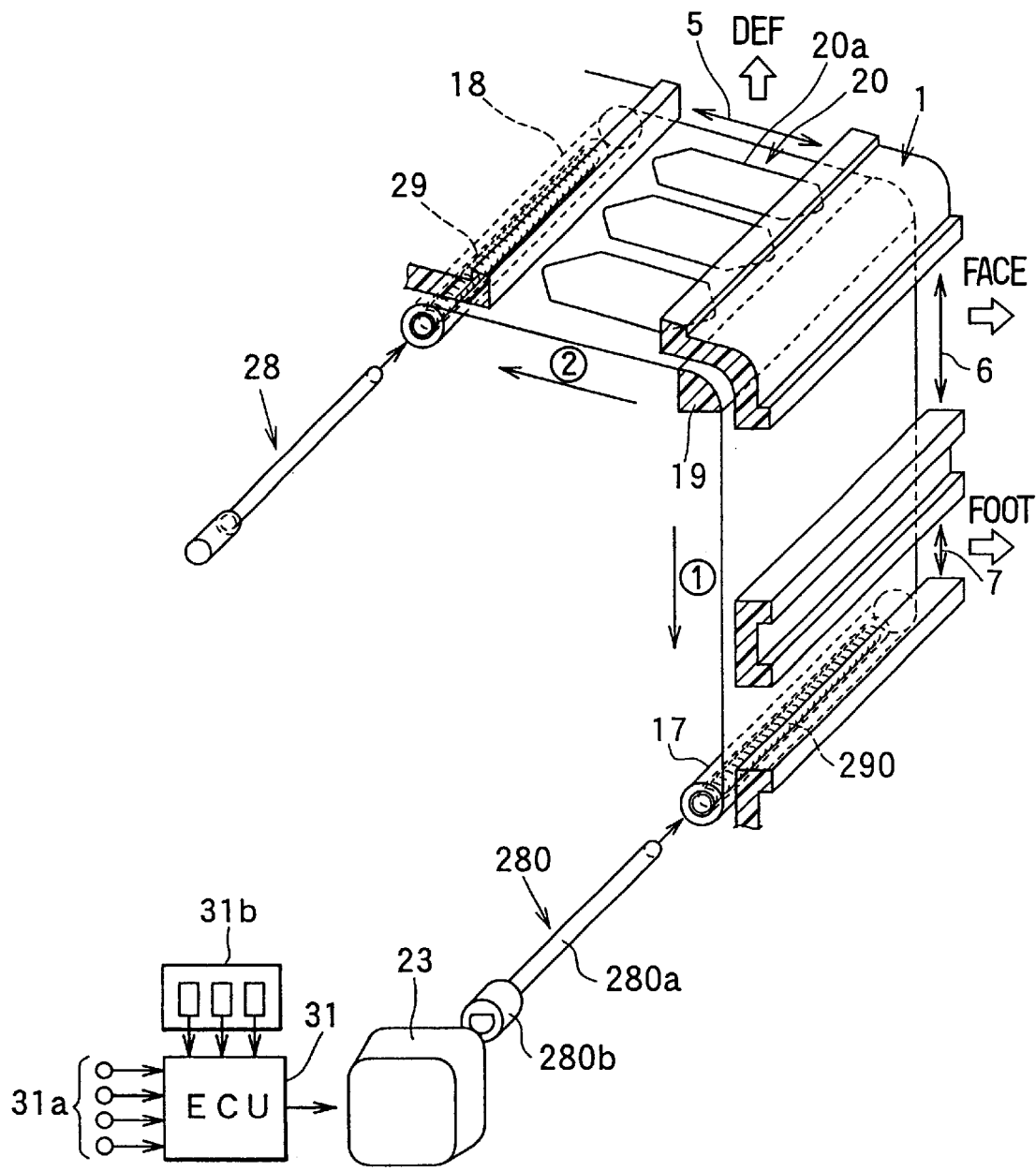
FIG. 19 is an exploded perspective view of a blow out mode selector according to a sixth preferred embodiment of the present invention.

FIG. 19 shows a sixth preferred embodiment of the present invention, wherein elastic (spring) members are built in to each of the two take-up shafts of the film door 13, 20, 36 in the preferred embodiments described above, that is, the driving shaft 11, 17, 41 and the driven shaft 12, 18, 42; elastic (spring) forces are applied to the film door from both of the two take-up shafts, and by the elastic forces of the elastic members canceling each other out, a wire connection between the two take-up shafts can be dispensed with without there being an increase in the operating force of the film door.

FIG. 19 is a view corresponding to FIG. 2, and in FIG. 19 a driven shaft 18 side of a mechanism for moving a film door 20 has the same structure as that of FIG. 2. That is, one end portion 29a of a coil spring 29 is connected to a guide bar 28 fixed to an air-conditioner case 1 and the other end portion 29b is connected to a driven shaft 18 which is rotatable with respect to the air-conditioner case 1.

Accordingly, the coil spring 29 is elastically wound up by rotation of the driven shaft 18 in one direction, and when a force rotating the driven shaft 18 in that direction is released the coil spring 29 unwinds under its own spring force and rotates the driven shaft 18 in the other direction (the opposite direction).

On the other hand, a driving shaft 17 side of this mechanism for driving the film door 20 has a structure different from that of FIG. 2, and the driving shaft 17 is made hollow (tubular) like the driven shaft 18. Instead of the bush 25 of FIG. 2 a guide bar 280 like the guide bar 28 is used, a coil spring 290 like the coil spring 29 is coiled around a spring-holding shaft portion 280a of this guide bar 280, and one end of the coil spring 290 is connected to the distal end of this spring-holding shaft portion 280a.

The spring-holding shaft portion 280a of the guide bar 280 and the coil spring 290 are inserted into the cavity in the driving shaft 17 and the other end of the coil spring 290 is connected to the driving shaft 17. The connection structure incorporating this coil spring 290 may be the same as the connection structure of the driven shaft 18 side shown in FIG. 4 and therefore will not be described in detail here. A large-diameter portion 280b at the base end of the guide bar 280 is connected to the output shaft of a stepping motor 23, and the guide bar 280 is rotated by the stepping motor 23.

Figure 20A:
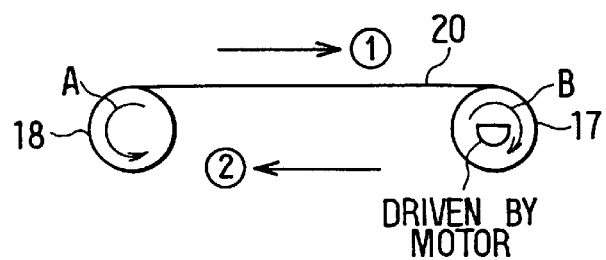
FIGS. 20A and 20B are an illustration and a graph to explain an operation of the sixth embodiment.

FIG. 20A is a schematic illustration showing a main portion of the sixth embodiment. The coil spring 29 in the driven shaft 18 side has its winding-up direction set so that its spring force A acts in the direction ② in which the film door 20 is taken up by the driven shaft 18. The coil spring 290 in the driving shaft 17 side, on the other hand, has its winding-up direction set so that its spring force B acts in the direction ① in which the film door 20 is taken up by the driving shaft 17.

That is, the spring force A of the coil spring 29 of the driven shaft 18 side and the spring force B of the coil spring 290 of the driving shaft 17 side act in mutually opposite directions. The spring forces A, B of the two coil springs 29, 290 are set to be approximately equal so that they can cancel each other out.

Figure 21A:
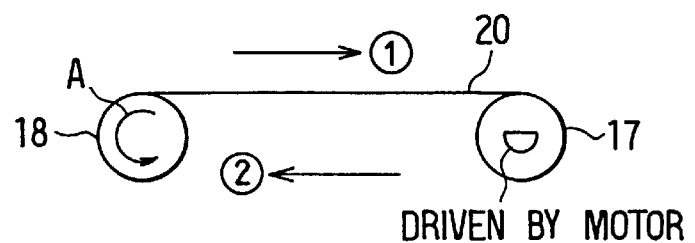
FIGS. 21A and 21B are an illustration and a graph to explain an operation of the first preferred embodiment to compare the operation of the sixth embodiment.

Next, the operation of this sixth preferred embodiment will be described by comparison with the first preferred embodiment. FIG. 21A is a schematic illustration of a main portion of the first preferred embodiment, and corresponds to FIG. 20A. In the first preferred embodiment, no coil spring 290 is provided on the driving shaft 17 side.

Figure 20B:
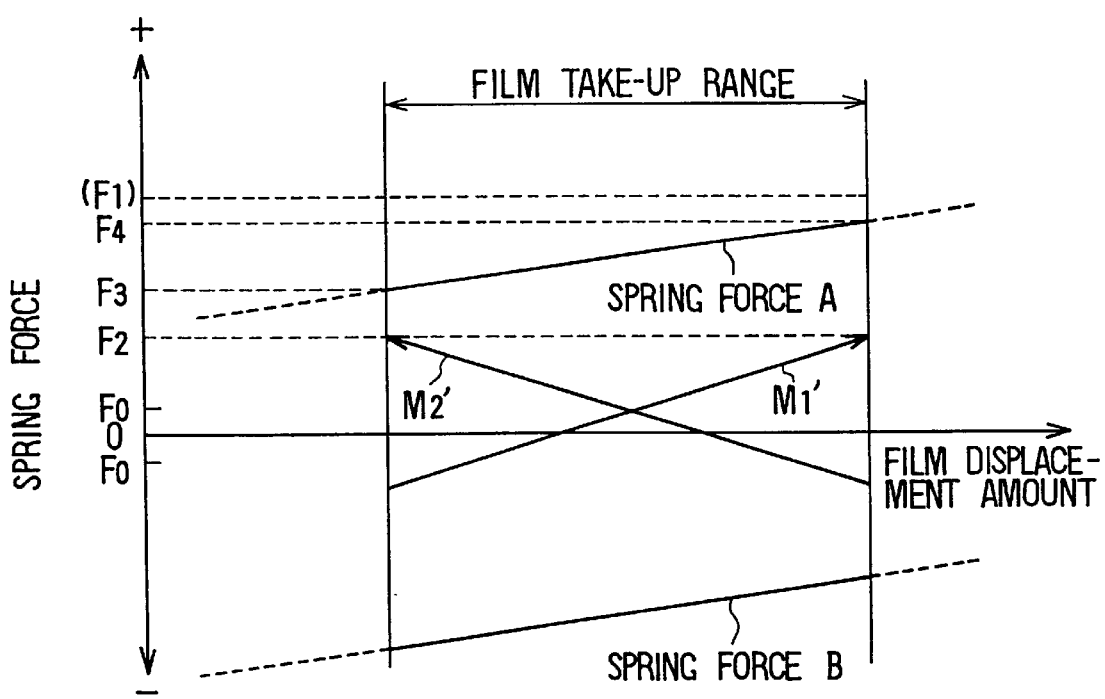
Figure 21B:
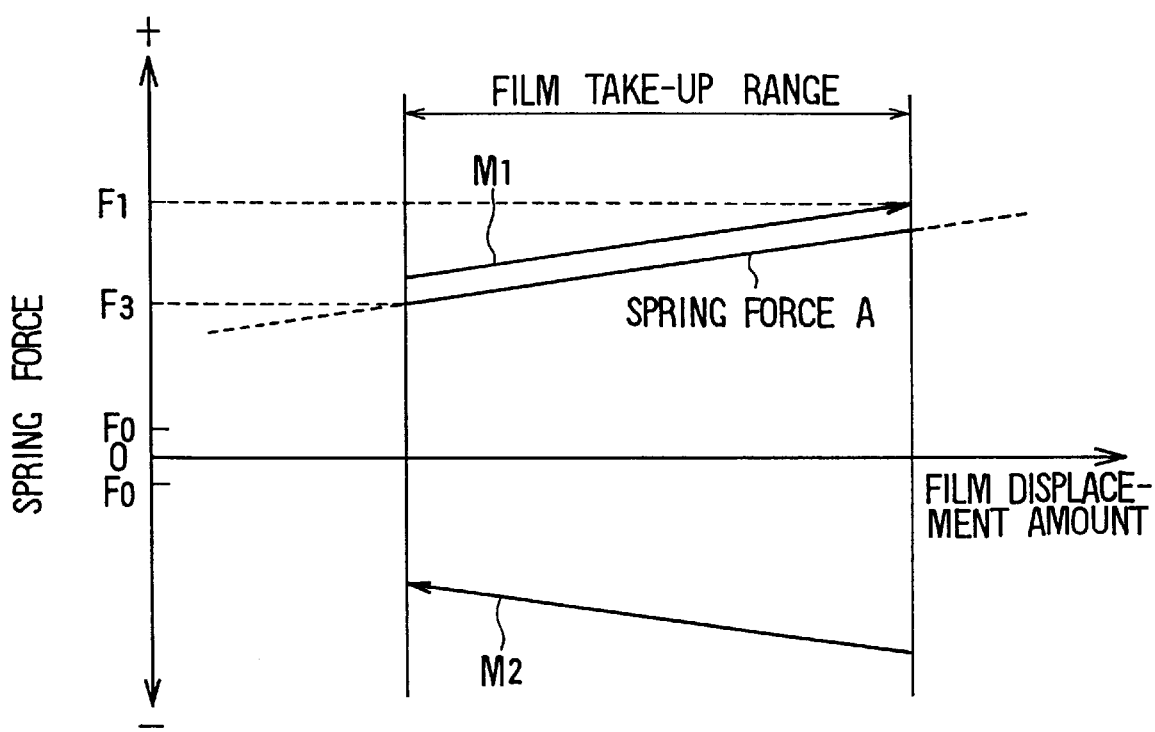

FIG. 20B and FIG. 21B are charts showing spring force on a vertical axis and displacement of the film door 20 on a horizontal axis. On the vertical axis, a spring force which pulls the film door 20 in the direction ② (to the left) is taken to be positive and a spring force which pulls the film door 20 in the direction ① (to the right) is taken to be negative.

In FIG. 20B and FIG. 21B, $F_0$ is the frictional force of the film door 20, and $F_3$ is the minimum force necessary to take up the film door 20 onto the shaft and is a value larger by a predetermined amount than the frictional force $F_0$.

In the first preferred embodiment, because no coil spring 290 is provided on the driving shaft 17 side, when the film door 20 displaces in the direction ① (to the right) the film door 20 winds up the coil spring 29 of the driven shaft 18 side as it displaces. Consequently, along with an increase in the displacement of the film door 20 in the direction ① (to the right), the spring force A increases, as shown in FIG. 21B.

Therefore, the motor force M1 necessary when the film door 20 displaces in the direction ① is $F_0$+spring force A, and rises to a maximum value of $F_1$.

According to the sixth preferred embodiment in FIG. 20B, however, because the spring forces A and B of the two coil springs 29, 290 have been set to approximately the same size so that they can cancel each other out, the motor force M1' necessary when the film door 20 displaces in the direction ① (to the right) is $F_0$+spring force A+spring force B, and its maximum value $F_2$ is much smaller than the above-mentioned value $F_1$.

The motor force M2' necessary when the film door 20 displaces in the direction ② (to the left) is $F_0$−spring force A–spring force B, and its maximum value is $F_2$. Thus, according to the sixth preferred embodiment, the motor force necessary for taking up the film door 20 can be effectively reduced, and this is extremely advantageous for example in reducing the size of the drive motor.

In FIG. 21B, M2 represents a motor force necessary when the film door 20 displaces in the direction ② (to the left) and is $F_0$–spring force A.

In FIG. 20B, $F_4$ is the maximum value of the spring force A (or the spring force B), and the relationship between the minimum force $F_3$ necessary for taking up the film door 20 onto the shaft and the maximum value $F_4$ of the spring force is set so that $(F_4/2)<F_3$. The reason for this setting will now be explained.

The necessary motor force becomes a maximum at the ends of the film door take-up range, as shown in FIG. 20B.

Figure 22:
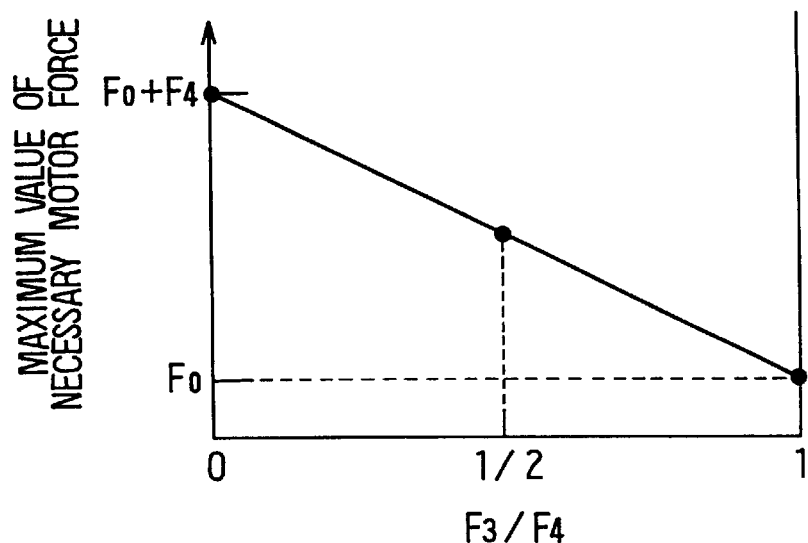
FIG. 22 is a graph to explain the operation of the sixth embodiment.

Here, the influence that the ratio $(F_3/F_4)$ of the minimum spring force $F_3$ to the maximum spring force $F_4$ at these ends has upon the maximum value of the necessary motor force is as shown in FIG. 22. That is, because the maximum value of the necessary motor force is $F_0+F_4-F_3$, there is a relationship that as $F_3/F_4$ approaches 1 the maximum value of the necessary motor force decreases.

When $F_3=0$ and therefore $(F_3/F_4=0)$, the maximum necessary motor force becomes $F_0+F_4$, which is the same as in the case of the spring force A only, and there is no canceling effect of the spring force B. On the other hand, $F_3=F_4$ ($F_3/F_4=1$) most enables the necessary motor force to be made small, but because the spring forces always change with the displacement, $F_3=F_4$ is impossible to obtain.

Therefore, in practice, the effective region in which the necessary motor force can be made small is, from FIG. 22, $(\frac{1}{2})<(F_3/F_4)$, and this is the range $(F_4/2)<F_3$ specified above.

(Other Modifications)

[1] Although in each of the foregoing first through sixth preferred embodiments a case in which a stepping motor is used as the motor for driving the air passage switching film door 13, 20, 36 was described, a D.C. motor can also be used as this driving motor.

In the case of the D.C. motor, because it is not possible to regulate motor rotation by pulse count as with a stepping motor, the rotation of the driving shaft being driven by the motor is detected by position detecting means such as a potentiometer and feedback control of the current supply to the D.C. motor is carried out so that the actual rotation approaches a target rotation.

[2] When as in the modification of the first preferred embodiment described above the speed of movement of the blow out mode switching film door 20 in the automatic mode is made lower than in the manual mode, when the driving motor is a D.C. motor, because the motor rotation speed can be varied by varying the voltage applied to the motor, in the case of the automatic mode, the D.C. motor voltage is lowered to reduce the motor speed. Accordingly, it is possible to lower the speed of movement of the film door 20 and reduce noise accompanying sliding of the film door 20.

[3] Also in the inside/outside air mode switching in the fifth preferred embodiment, the speed of movement of the inside/outside air mode switching film door 36 in the automatic mode may be made lower than in the manual mode to reduce noise accompanying sliding of the film door 36.

[4] Although in each of the first through sixth preferred embodiments a case in which a stepping motor is used as the means for driving the air passage switching film door 13, 20, 36 was described, a manual control mechanism such as a dial or a lever incorporated in the air conditioning control panel for manual operation by an occupant may be used as driving means of the film door 13, 20, 36.

[5] Although in each of the foregoing first through sixth preferred embodiments a case in which the invention is applied to a vehicle air conditioning apparatus was described, the invention is not limited to vehicle air conditioning apparatuses and can be applied widely as an air passage switching device in various applications.

(Seventh Embodiment)

Figure 23:
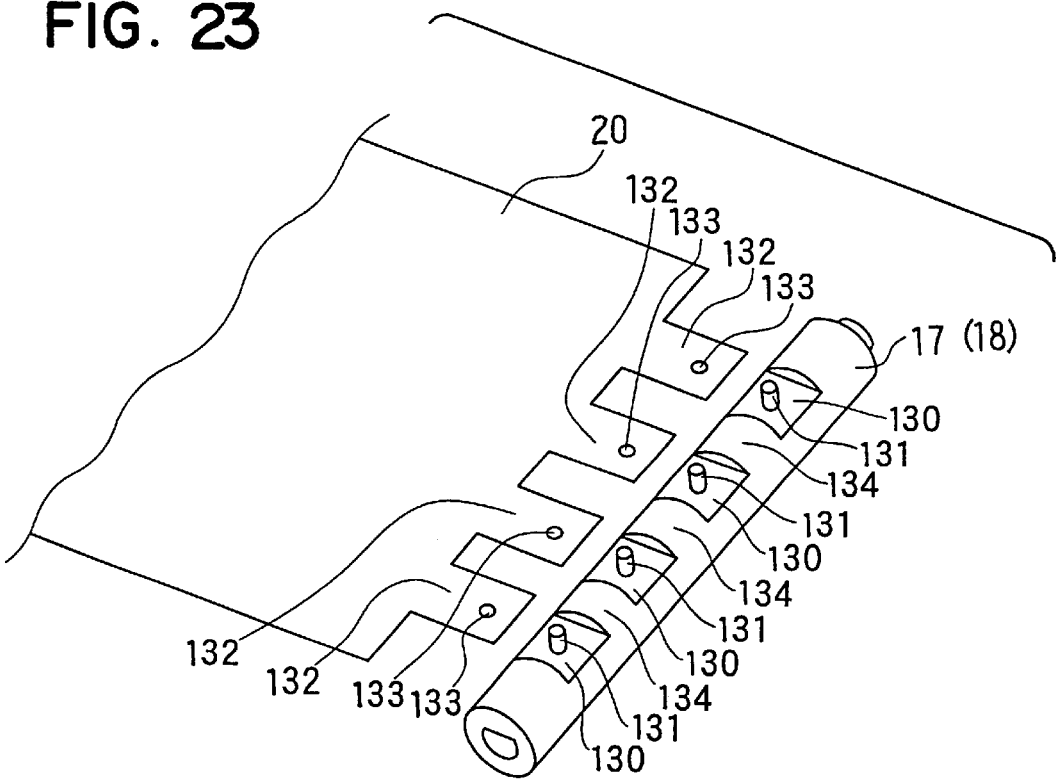
FIG. 23 is an exploded perspective view of a fixing structure of a film door according to a seventh embodiment of the present invention.
Figure 24:
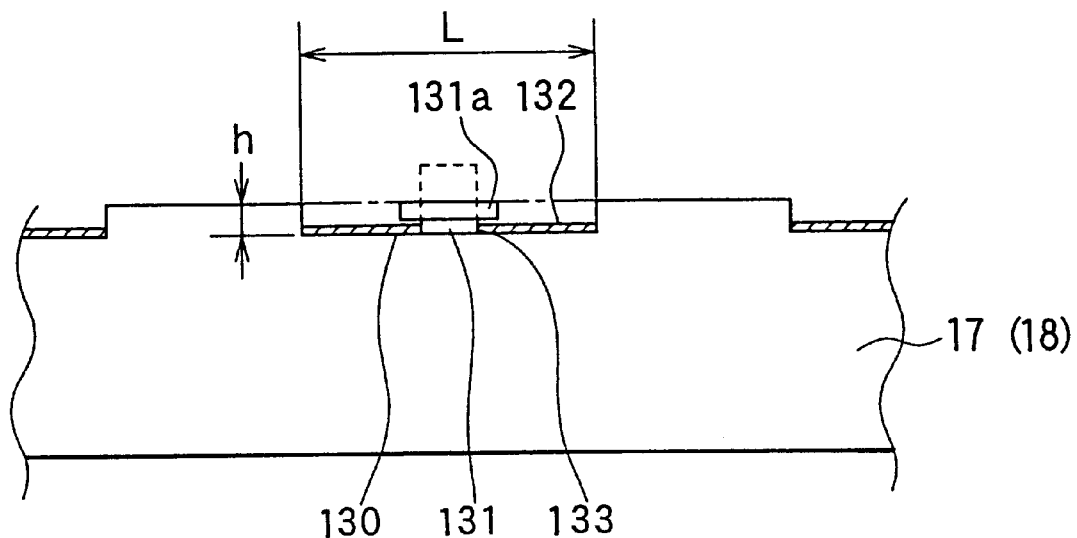
FIG. 24 is a part of a sectional view of the fixing structure of the film door after assembling according to the seventh embodiment.
Figure 25:
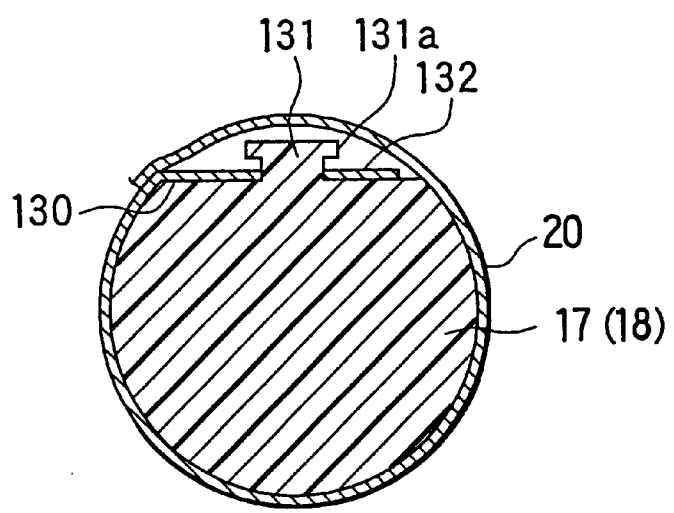
FIG. 25 is a part of a sectional view of the fixing structure of the film door after assembling according to the seventh embodiment.

The fixing structure by which the film door 20 is fixed to the driving shaft 17 and the driven shaft 18 in the foregoing preferred embodiments will now be described, with reference to FIGS. 23 through 25. FIGS. 23 through 25 show the structure by which the film door 20 is fixed to the driving shaft 17, but the fixing structure by which the film door 20 is fixed to the driven shaft 18 may be exactly the same.

Recesses 130 are formed with a uniform spacing in a plurality of (in the example shown, four) locations in the axial direction of the outside of the shaft 17, 18. These recesses 130 have flat faces positioned at a predetermined depth (height) h from the outside of the shaft 17, 18. A cylindrical, pin-shaped projection 131 is formed from resin integrally with the shaft 17, 18 in the center of each of the recesses 130. The projections 131 have a height such that before they are thermally caulked they project to outside the outer surface of the shaft 17, 18, as shown with a dashed line in FIG. 24.

A plurality of (in the example shown, four) connecting tabs 132 are formed projecting from each end of the film door 20; the width of each of these connecting tabs 132 is set to be no greater than the axial length L of each of the recesses 130, and the connecting tabs 132 are fitted in the recesses 130. A circular connecting hole 133 having a diameter that enables the respective projection 131 to fit in the center of each of the connecting tabs 132.

After the connecting holes 133 of the connecting tabs 132 at an end of the film door 20 have been fitted over the projections 131 of the recesses 130 in the respective shaft 17, 18, the ends of the resin projections 131 are thermally caulked to form on each an enlarged head portion 131a (FIGS. 24, 25) having an outer diameter amply larger than that of the connecting holes 133, and because the connecting tabs 132 are surely anchored by these enlarged head portions 131a the connecting tabs 132 at the end of the film door 20 are fixed in the recesses 130 of the shaft 17, 18 by the projections 131.

The height of the projections 131 after thermal caulking is set to a height such that they do not project to outside the outer surface of the shaft 17, 18, as shown in FIG. 24, that is, to a height not greater than the above-mentioned depth h of the recesses 130, and therefore the circular shaft shape of the shaft 17, 18 is not interrupted by the presence of the projections 131. Also, because there are a plurality of recesses 130 and spaces therebetween, circular shaft portions 134 are formed between these adjacent recesses 130.

As a result, the film door 20 can be taken up and let out smoothly by the shafts 17, 18. If the projections 131 were to project to outside the outer face of the respective shaft 17, 18, creases would form in the film door 20 when it is taken up and cause extraneous noise; in this preferred embodiment, on the other hand, the occurrence of this kind of problem is surely prevented.

(Eighth Embodiment)

Figure 26:
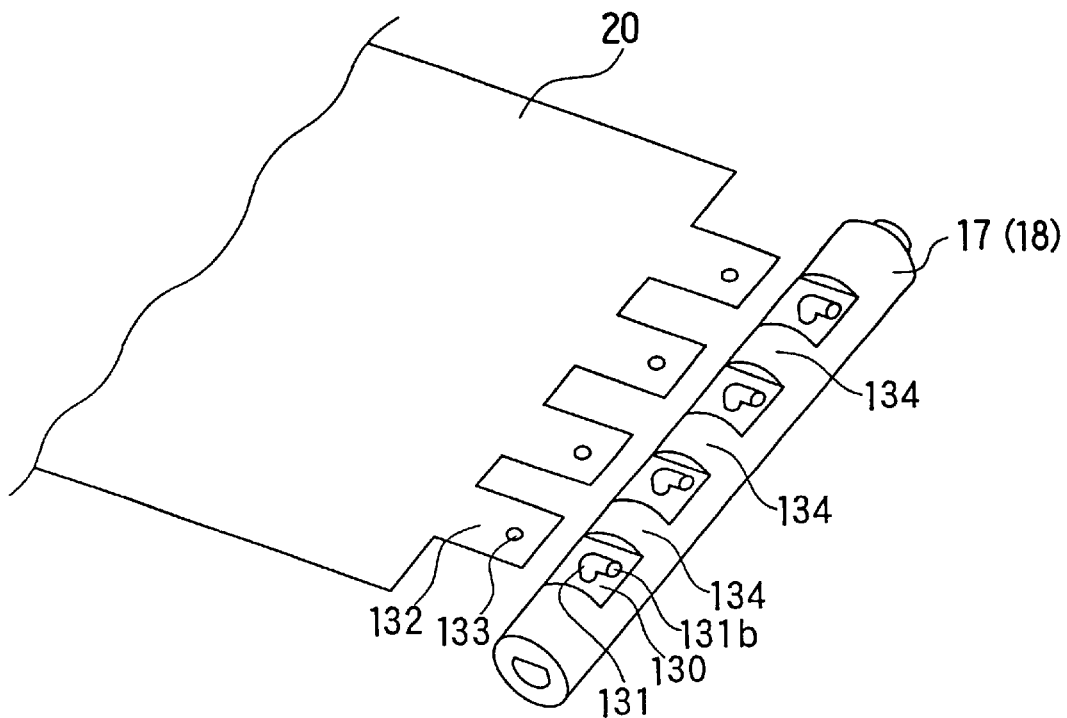
FIG. 26 is an exploded perspective view of a fixing structure of a film door according to an eighth embodiment of the present invention.
Figure 27:
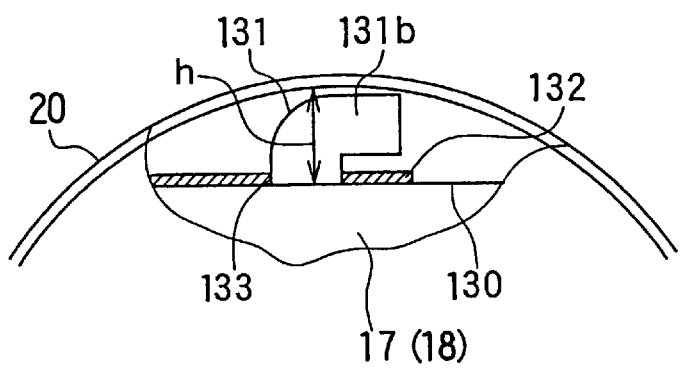
FIG. 27 is a part of a sectional view of the fixing structure of the film door after assembling according to the eighth embodiment.

FIG. 26 and FIG. 27 show an eighth preferred embodiment of the present invention. Whereas in the seventh preferred embodiment cylindrical, pin-shaped projections 131 are formed in the centers of the recesses 130, in this eighth preferred embodiment the projections 131 are made hook-shaped so that they have anchoring portions 131b bent off at a right angle. The height of these hook-shaped projections 131 is made not greater than the depth h of the recesses 130.

According to this eighth preferred embodiment, by the connecting holes 133 of the connecting tabs 132 at the ends of the film door 20 being fitted over the projections 131 of the recesses 130 in the respective shafts 17, 18, the connecting holes 133 are surely anchored by the bent anchoring portions 131b of the projections 131 without the projections 131 having to be thermally caulked, and thus it is possible for the ends of the film door 20 to be fixed to the recesses 130 in the shafts 17, 18 by the projections 131.

And in this eighth preferred embodiment also, because the height of the hook-shaped projections 131 is made smaller than the depth h of the recesses 130, the circular shaft shape of the shafts 17, 18 is not interrupted by the presence of the projections 131. Consequently, as in the seventh preferred embodiment, taking up and letting out of the film door 20 by the shafts 17, 18 is carried out smoothly.

(Ninth Embodiment)

In the first through eighth embodiments, an initialization of the film door 20 may be executed as follows.

When a vehicle air conditioning apparatus is installed in a vehicle and the air conditioning control unit 31 is first connected to a vehicle battery (not shown), or when for replacement or testing of the battery the electrical connection between the air conditioning control unit 31 and the battery is once cut and then the air conditioning control unit 31 and the battery are reconnected, the initialization of the film door position becomes necessary.

Accordingly, in the air conditioning control unit 31, when on the basis of a signal reporting electrical connection to the battery and an ON signal from an ignition switch of the vehicle engine it is determined that a necessary condition for initial position setting of the film door 20 is established (for example, when the ignition switch has been switched on for the first time after the air conditioning control unit 31 is electrically connected to the battery), the air conditioning control unit 31 runs the stepping motor 23 for a predetermined time and drives the driving shaft 17 in the clockwise direction A of FIGS. 28A through 28D until the film door 20 is fully taken up on the driving shaft 17 side (and the driving shaft 17 can rotate no further) and then automatically sets the initial position of the film door 20. This initial position of the film door 20 corresponds to step number 0 of input pulse of the stepping motor 23.

The reason for rotating the driving shaft 17 in the clockwise direction A at the initialization will now be explained.

Figure 28A:
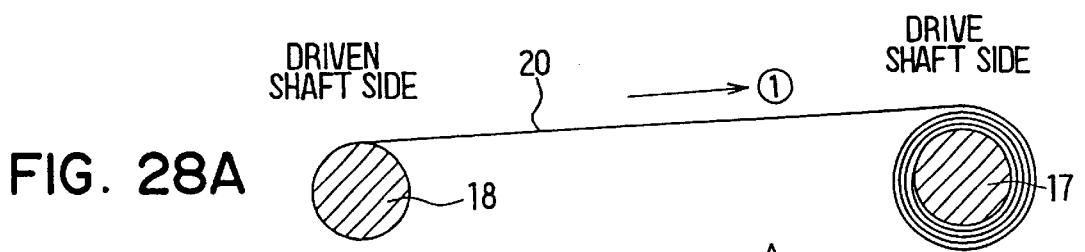
FIGS. 28A to 28D are illustrations to explain an initialization of a film door position according to a ninth embodiment of the present invention.
Figure 28B:
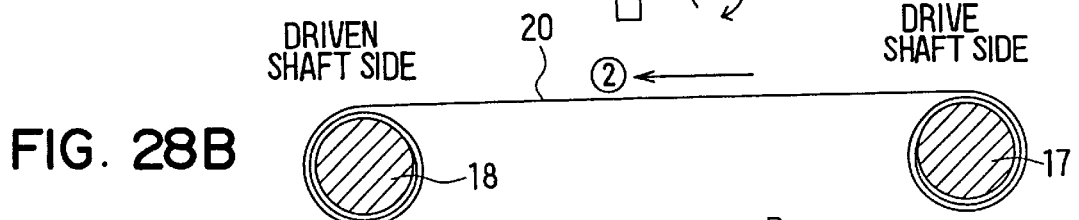

FIG. 28A illustrates a condition that the film door 20 is completely taken up by the driving shaft 17 after rotating the driving shaft 17 in the clockwise direction "A" by the stepping motor 23 to move the film door 20 in the direction ①. Under this condition shown in FIG. 28A, the coil spring 29 connected to the driven shaft 18 is wound up and holds the spring force.

When the driving shaft 17 rotates in reverse direction, that is counterclockwise direction "B", to unwind (let out) the film door 20 from the condition shown in FIG. 28A, the film door 20 moves in the direction ②, and the driven shaft 18 rotates in the counterclockwise direction "B" by the spring force of the coil spring 29, and the film door 20 is taken up by the driven shaft 18.

Figure 28C:
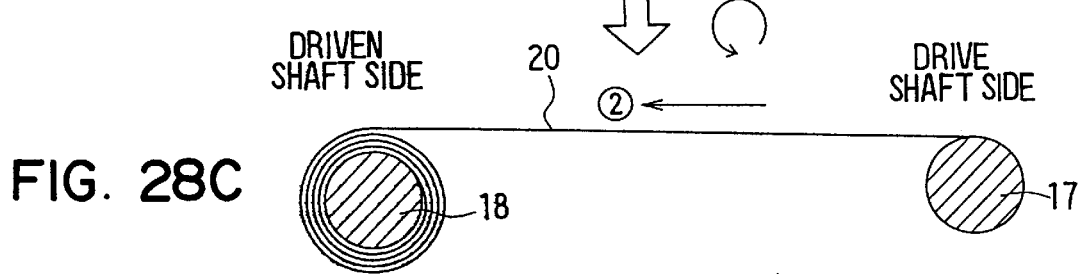
Figure 28D:
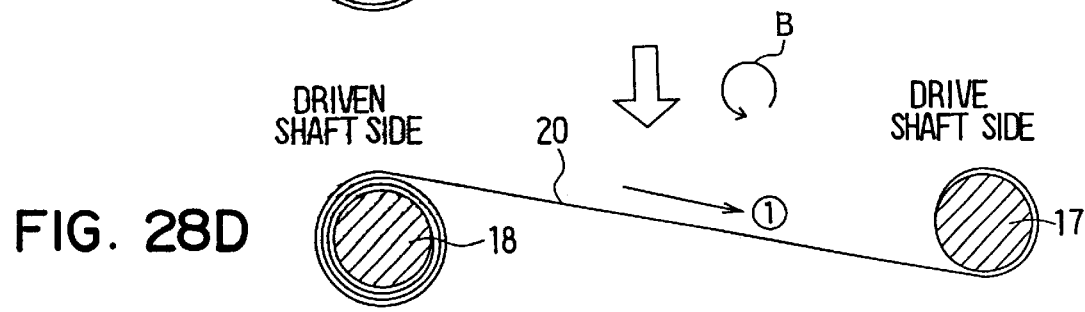
Figure 29:
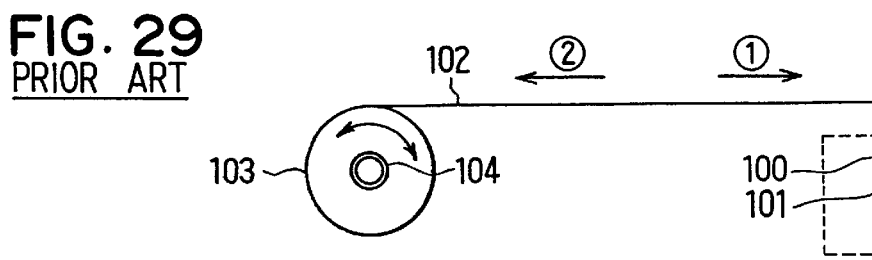
FIG. 29 is a schematic illustration showing a basic structure of a related art device.

When the unwinding (letting out) of the film door 20 from the driving shaft 17 is completed as shown in FIG. 28C, the driving shaft 17 starts to wind up the film door 20 in a rotational direction opposite to the rotational direction shown in FIG. 28A by continuing the rotation of the driving shaft 17 in the counterclockwise direction "B" as shown in FIG. 28D. In other words, the movement direction of the film door 20 is reversed from the direction ② to the direction ① to wind back the film door 20 from the driven shaft 18, and the reverse winding up to the driving shaft 17 may be started.

In that case, the film door 20 is not locked (fixation of the film door position) because of the structure, and the reverse movement (reversing from the direction ② to the direction ①) of the film door 20 may be caused. As a result, the initialization of the film door position at the driven shaft 18 is hard to achieve.

According to the ninth embodiment, however, when the condition of FIG. 28A is established, that is, when the unwinding of the film door 20 from the driven shaft 18 is completed by rotating the driving shaft 17 in the clockwise direction "A", the rotation of the driving shaft 17 is locked after completing the movement of the film door 20 in the direction ①.

Because the rotation of the driving shaft 17 is stopped when the winding up of the film door 20 at the driving shaft 17 is completed, the initialization of the film door position is simply and reliably achieved.

Further, if the initialization of the film door position is carried out at the driven shaft 18, the condition shown in FIG. 28D may occur, and the wind up reversing of the film door 20 may occur at the driving shaft 17. This wind up reversing may bent the end portion of the film door 20 and give a damage to the film door 20.

According to the ninth embodiment of the present invention, however, the initialization of the film door position is carried out without the wind up reversing of the film door 20. Accordingly, a damage of the film door 20 is prevented.

Although in the foregoing preferred embodiments a case in which a stepping motor is used as the means for driving the film door 20 was described, a manual control mechanism such as a dial or a lever incorporated in the air conditioning control panel for manual operation by an occupant can be linked to the film door 20 by a suitable linking mechanism and this manual control mechanism used as driving means of the film door 20, if possible.

The initialization of the position of the film door 20 is sometimes necessary even when a motor other than a stepping motor is used.

For example, when a D.C. motor is used as the motor for driving the film door 20 and openings for light to pass through are provided in a plate rotating integrally with the D.C. motor and a light-emitting device and a light-receiving device are disposed facing each other on either side of the rotating plate so that light from the light-emitting device reaches the light-receiving device through the openings and the amount of rotation (the rotational position) of the D.C. motor is detected on the basis of the count of a pulse signal generated in correspondence with light received by the light-receiving device, because it is not the absolute position of the film door 20 that is being detected but rather it is only its relative position with respect to the starting position of the D.C. motor that is being detected, initialization of the position of the film door 20 becomes necessary as in the case of the stepping motor, and therefore the invention can be similarly applied.

According to the above described embodiments, when the moving speed of the film door 20 becomes greater, the noise caused by a friction between the film door 20 and the wall surface of the air-conditioner case 1 also becomes greater. Accordingly, the passenger compartment may become noisy. On the other hand, the motor rotation speed of the stepping motor 23 can be changed by changing the pulse rate PPS, that is, the pulse count per second, to be applied to the stepping motor 23.

The switching of the blow out mode is generally carried out by the automatic mode and the manual mode. Here, the automatic mode is a mode in which the air conditioning control unit 31 automatically determines based on the input signals from the sensors 31a. The manual mode is based on the passenger's manual operation, that is, turning on the blow out mode switch of the air conditioning control panel 31b.

In the case of the automatic mode, the pulse rate PPS of the stepping motor 23 may be smaller than the manual mode, thereby reducing the motor rotation speed and the moving speed of the film door 20 even if the movement is carried out by the spring force of the coil spring 29. Accordingly, the friction noise of the film door 20 is reduced, and the noise in the passenger compartment is reduced.

In other words, the switching to the defroster mode during the automatic mode is not based on the passenger's manual operation. Thus, the noise reduction is given priority over the time reducing of the mode switching to reduce the noise in the passenger compartment.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An air passage switching device for switching a plurality of air passages, comprising:
   a film having a first end and a second end for switching the air passages;
   a first rotation shaft to which said first end of said film is connected;
   a second rotation shaft to which said second end of said film is connected, said second rotation shaft having an elastic member; and
   a stepping motor connected to said first rotation shaft for rotating said first rotation shaft, wherein;
      said elastic member is deformed to increase its elastic force as said second rotation shaft rotates when said first rotation shaft is rotated in a first rotational direction by said stepping motor such that said first end of said film is wound up by said first rotation shaft;
      said second rotation shaft is rotated by said elastic force of said elastic member such that said second end of said film is wound up by said second rotation shaft when said first rotation shaft is rotated in a second rotational direction opposite to said first rotational direction by said stepping motor and when said first end of said film is unwound from said first rotation shaft; and
      a relation between a first pulse rate applied to said stepping motor when said first end of said film is wound up by said first rotation shaft and a second pulse rate applied to said stepping motor when said second end of said film is wound up by said second rotation shaft is established in such a manner that said first pulse rate is less than second pulse rate.

2. An air passage switching device as in claim 1, wherein said elastic member includes a coil spring.

3. An air passage switching device as in claim 2, wherein:
   said second rotation shaft includes a cavity along an axial direction of said second rotation shaft; and
   said coil spring is housed in said cavity.

4. An air passage switching device as in claim 1, wherein said first pulse rate is gradually reduced as said elastic force increases when said first end of said film is wound up by said first rotation shaft.

5. An air passage switching device as in claim 1, wherein:
   the air passages are switched between at least two opening modes by said film; and
   a switching to one of said opening modes which requires a shorter switching time is performed by moving said film with said elastic force of said elastic member.

6. An air passage switching device as in claim 1, wherein:
   a movement of said film is performed in both of an automatic mode and a manual mode; and
   said first pulse rate and said second pulse rate for said manual mode is greater than that for said automatic mode.

7. A vehicle air conditioning apparatus having an air passage switching device as in claim 5, wherein:
   the air passages include a defroster outlet port for blowing an air conditioning draft to defrost a windshield, a face outlet port for blowing said air conditioning draft toward an upper body of a passenger, and a foot outlet port for blowing said air conditioning draft toward a foot of the passenger;
   said opening modes include a face mode to open said face outlet port, a defroster mode to open said defroster outlet port, and a foot mode to open said foot outlet port, to be switched by moving said film;
   a switching to said face mode from said defroster mode is performed by moving said film with said stepping motor; and
   a switching to said defroster mode from said face mode is performed by moving said film with said elastic force of said elastic member.

8. A vehicle air conditioning apparatus according to claim 7, wherein:
   a switching among said face mode, said foot mode and said defroster mode is performed in both of an automatic mode and a manual mode; and
   said first pulse rate and said second pulse rate are greater when said defroster mode is chosen in said manual mode than that for other opening modes.

9. An air passage switching device for switching a plurality of air passages, comprising:
   a film having a first end and a second end for switching the air passages;
   a first rotation shaft to which said first end of said film is connected;
   a second rotation shaft to which said second end of said film is connected, said second rotation shaft having an elastic member; and
   a stepping motor connected to said first rotation shaft for rotating said first rotation shaft, wherein;

said elastic member is deformed to increase its elastic force as said second rotation shaft rotates when said first rotation shaft is rotated in a first rotational direction by said stepping motor such that said first end of said film is wound up by said first rotation shaft;

said second rotation shaft is rotated by said elastic force of said elastic member such that said second end of said film is wound up by said second rotation shaft when said first rotation shaft is rotated in a second rotational direction opposite to said first rotational direction by said stepping motor and when said first end of said film is unwound from said first rotation shaft; and a pulse rate applied to said stepping motor is gradually reduced as said elastic force increases when said first end of said film is wound up by said first rotation shaft.

10. An air passage switching device as in claim 9, wherein:

the air passages are switched between at least two opening modes by said film; and a switching to one of said opening modes which requires a shorter switching time is performed by moving said film with said elastic force of said elastic member.

11. An air passage switching device as in claim 9, wherein:

a movement of said film is performed in both of an automatic mode and a manual mode; and said pulse rate for said manual mode is greater than that for said automatic mode.

* * * * *